(12) United States Patent
Yogo et al.

(10) Patent No.: US 10,655,991 B2
(45) Date of Patent: May 19, 2020

(54) PHYSICAL-QUANTITY DETECTION DEVICE FOR INTAKE AIR IN AN INTERNAL COMBUSTION ENGINE

(71) Applicant: Hitachi Automotive Systems, Ltd., Hitachinaka-shi, Ibaraki (JP)

(72) Inventors: Takayuki Yogo, Hitachinaka (JP); Hiroaki Hoshika, Hitachinaka (JP); Takahiro Miki, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 198 days.

(21) Appl. No.: 15/329,539

(22) PCT Filed: Jun. 15, 2015

(86) PCT No.: PCT/JP2015/067113
§ 371 (c)(1),
(2) Date: Jan. 26, 2017

(87) PCT Pub. No.: WO2016/017300
PCT Pub. Date: Feb. 4, 2016

(65) Prior Publication Data
US 2017/0211958 A1  Jul. 27, 2017

(30) Foreign Application Priority Data
Jul. 30, 2014 (JP) .................. 2014-154712

(51) Int. Cl.
*G01M 15/04* (2006.01)
*G01F 1/684* (2006.01)
*G01F 5/00* (2006.01)

(52) U.S. Cl.
CPC .............. *G01F 1/684* (2013.01); *G01F 5/00* (2013.01)

(58) Field of Classification Search
USPC .............. 73/114.31, 114.32, 114.33, 114.34, 73/114.37
See application file for complete search history.

(56) References Cited

U.S. PATENT DOCUMENTS 4,873,123 A * 10/1989 Canestaro ............ H05K 1/0271
438/618
5,847,275 A  12/1998 Kondo et al.
(Continued)

FOREIGN PATENT DOCUMENTS

EP  1 279 934 A2  1/2003
EP  2202491 A2  6/2010
(Continued)

OTHER PUBLICATIONS

Extended European Search Report issued in corresponding application No. 15827979.4 dated Feb. 22, 2018.
(Continued)

*Primary Examiner* — Eric S. McCall
(74) *Attorney, Agent, or Firm* — Foley & Lardner LLP

(57) ABSTRACT

In order to improve the characteristic precision of a sensor, an electronic circuit board on which a detection unit that measures a physical quantity is mounted is integrally formed together with a housing so as to reduce mounting variability. This physical-quantity detection device 300 is characterized by having a circuit board 400 and a housing 302 that accommodates said circuit board 400, wherein the circuit board 400 is provided with one or more detection units 602 that detect physical quantities of a gas being measured 30 that passes through a main channel 124, the circuit board 400 is also provided with a circuit unit that performs a computation on the physical quantity detected by each
(Continued)

detection unit 602, the housing 302 is formed from a molded resin, and the circuit board 400 is integrally formed together with the housing 302.

9 Claims, 40 Drawing Sheets

(56) References Cited

U.S. PATENT DOCUMENTS

| | | | |
|---|---|---|---|
| 2003/0168043 A1* | 9/2003 | Sakurai | F02D 41/3005 |
| | | | 123/399 |
| 2005/0150290 A1* | 7/2005 | Kawai | G01F 1/6845 |
| | | | 73/204.22 |
| 2005/0168195 A1 | 8/2005 | MacDougall | |
| 2005/0223794 A1 | 10/2005 | Zurek et al. | |
| 2007/0068491 A1* | 3/2007 | Kurita | G01D 5/145 |
| | | | 123/399 |
| 2008/0264165 A1 | 10/2008 | Abe et al. | |
| 2009/0323760 A1* | 12/2009 | Gebauer | G01D 11/24 |
| | | | 374/143 |
| 2011/0072894 A1 | 3/2011 | Saito et al. | |
| 2012/0160024 A1 | 6/2012 | Matsumoto et al. | |
| 2012/0198925 A1 | 8/2012 | Saito et al. | |
| 2013/0047742 A1 | 2/2013 | Yamaguchi et al. | |
| 2014/0313675 A1* | 10/2014 | Choo | H05K 7/20854 |
| | | | 361/709 |
| 2015/0122050 A1 | 5/2015 | Kono et al. | |
| 2015/0160054 A1 | 6/2015 | Tashiro et al. | |
| 2015/0168195 A1 | 6/2015 | Doi | |
| 2015/0192441 A1 | 7/2015 | Tokuyasu et al. | |
| 2018/0252564 A1 | 9/2018 | Tashiro et al. | |

FOREIGN PATENT DOCUMENTS

| | | |
|---|---|---|
| EP | 2 482 050 A2 | 8/2012 |
| EP | 2482050 A2 | 8/2012 |
| EP | 2 629 065 A1 | 8/2013 |
| JP | S61-245598 A | 10/1986 |
| JP | 1-154671 U | 10/1989 |
| JP | H06-061522 A | 3/1994 |
| JP | 06-265384 A | 9/1994 |
| JP | 2000-332466 A | 11/2000 |
| JP | 2002-318146 A | 10/2002 |
| JP | 2003-188480 A | 7/2003 |
| JP | 2004-119624 A | 4/2004 |
| JP | 2004-259995 A | 9/2004 |
| JP | 2005-318002 A | 11/2005 |
| JP | 2006-5209 A | 1/2006 |
| JP | 2006-328993 A | 12/2006 |
| JP | 2008-41787 A | 2/2008 |
| JP | 2008-175780 A | 7/2008 |
| JP | 2008-182126 A | 8/2008 |
| JP | 2009-164636 A | 7/2009 |
| JP | 2010-112804 A | 5/2010 |
| JP | 2010-151795 A | 7/2010 |
| JP | 2011-021940 A | 2/2011 |
| JP | 2011-75357 A | 4/2011 |
| JP | 2011-93799 A | 5/2011 |
| JP | 2012-057975 A | 3/2012 |
| JP | 2012-57983 A | 3/2012 |
| JP | 2012-137456 A | 7/2012 |
| JP | 2012-163504 A | 8/2012 |
| JP | 2012-163505 A | 8/2012 |
| JP | 2012-207931 A | 10/2012 |
| JP | 2013-033596 A | 2/2013 |
| JP | 2013-54013 A | 3/2013 |
| JP | 2013-64716 A | 4/2013 |
| JP | 2013-170915 A | 9/2013 |
| JP | 2013-217731 A1 | 10/2013 |
| JP | 2013-222870 A | 10/2013 |
| JP | 2014-001932 A | 1/2014 |
| JP | 2014-001968 A | 1/2014 |
| JP | 2014-009974 A | 1/2014 |
| JP | 2014-10023 A | 1/2014 |
| JP | 2014-010023 A | 1/2014 |
| JP | 2014-025814 A | 2/2014 |
| JP | 2014-35308 A | 2/2014 |
| JP | 2014-035308 A | 2/2014 |
| JP | 2015-187615 A | 10/2015 |
| MX | 2012003145 A | 9/2012 |
| WO | WO 2013/187228 A1 | 12/2013 |
| WO | WO-2013/187253 A1 | 12/2013 |
| WO | WO-2014/002735 A1 | 1/2014 |

OTHER PUBLICATIONS

Information Offer Form submitted by third party on offering of information for the corresponding Japanese Patent Application No. 2018-108241 to the JPO on Jan. 31, 2019 with its English machine translation.
CN First Office Action on Appl. No. 2015/80038769.5 dated Oct. 16, 2018.
Communication pursuant to Rule 114(2) EPC dated Nov. 19, 2018 in Application No. 15827979.4.
Communication pursuant to Rule 114(2) EPC dated Sep. 19, 2018 in Application No. 15827979.4. (1st) Third Party Observation, 3 pages.
Communication pursuant to Rule 114(2) EPC dated Sep. 19, 2018 in Application No. 15827979.4. (2nd) Third Party Observation, 3 pages.
Communication pursuant to Rule 114(2) EPC dated Oct. 29, 2018 in Application No. 15827979.4. (3rd).
Third party observations issued in European Patent Application No. 15827979.4 dated Apr. 29, 2019.
Information Offer Form submitted by third party on offering of information for the corresponding Japanese patent application No. 2018-108241 dated Apr. 22, 2019 with Machine translation.
Information offer Form submitted by third party on offering of information for the corresponding Japan Patent Application No. 2018-108241 to the Japan Patent Office on Oct. 11, 2018.
Office Action received in corresponding Japanese Application No. 2018-108241 dated Jun. 4, 2019 and English machine translation.
Communication Pursuant to Rule 114(2) EPC dated Feb. 26, 2019 in the Application No. 15827979.4.

\* cited by examiner

C1-C1 LINE SECTIONAL SURFACE

C1-C1 LINE SECTIONAL SURFACE

C2-C2 LINE SECTIONAL SURFACE

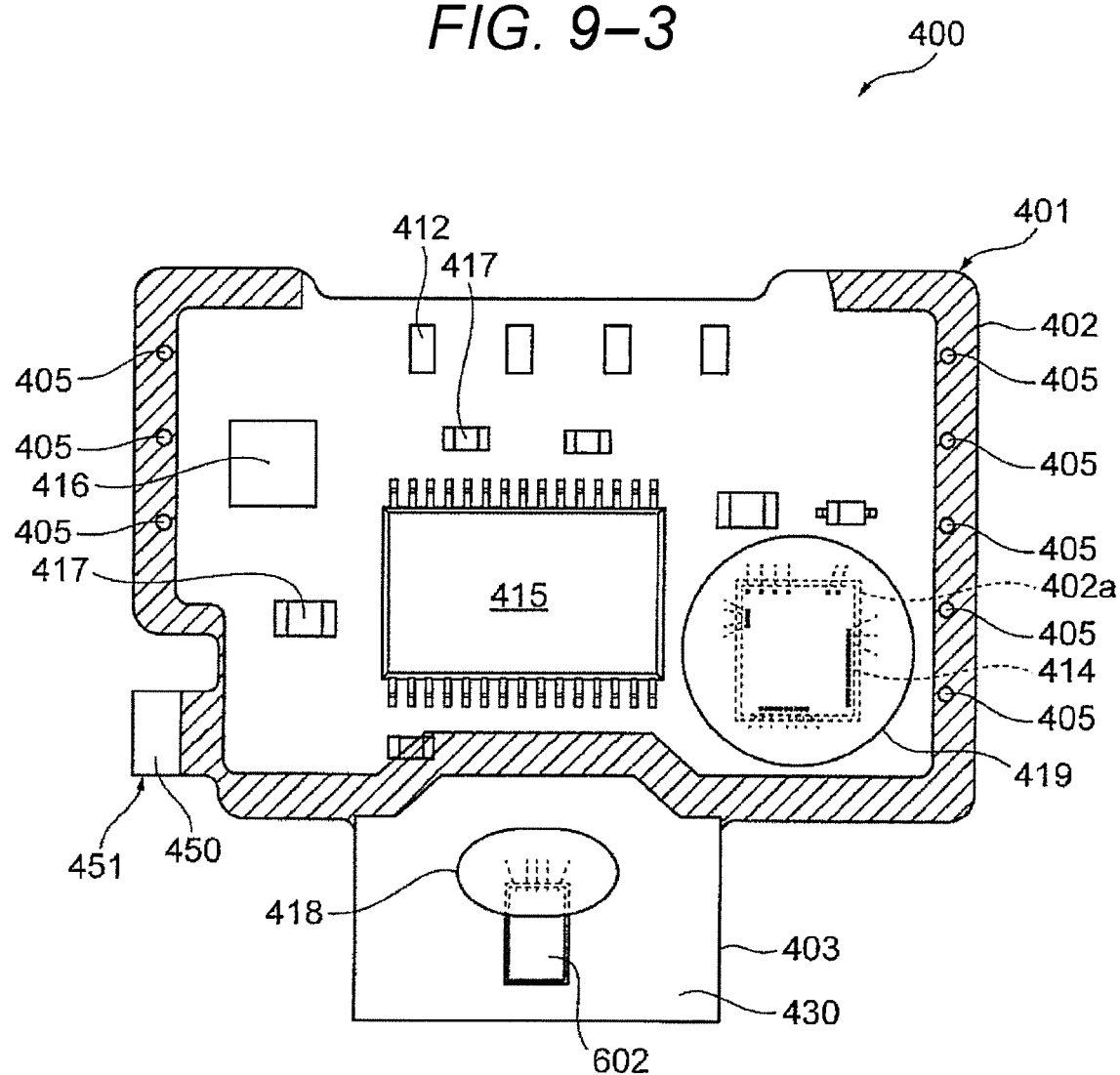

(a) BEFORE CUTTING (b) AFTER CUTTING

PHYSICAL-QUANTITY DETECTION DEVICE FOR INTAKE AIR IN AN INTERNAL COMBUSTION ENGINE

TECHNICAL FIELD

The present invention relates to a physical-quantity detection device for intake air in an internal combustion engine.

BACKGROUND ART

PTL 1 discloses a structure of an air flow rate measuring device. The air flow rate measuring device includes a sensing element for measuring a physical quantity on a circuit board in which a circuit unit is formed, the circuit unit of the circuit board is disposed in a case, and the sensing element of the circuit board is exposed outside. In PTL 1, the circuit board is adhesively fixed to the case.

CITATION LIST

Patent Literatures

PTL 1: JP 2012-163504 A

SUMMARY OF INVENTION

Technical Problem

As disclosed in PTL 1, in the case where a circuit board is adhesively fixed to a case, mounting variability of a circuit board with respect to the case may occur. When a position of the circuit board with respect to the case is moved, detection accuracy of a sensing element may be affected. To improve the detection accuracy of the sensing element, mounting variability of a circuit board including the sensing element needs to be reduced.

The present invention is in view of the above points, and an object of the present invention is to provide a physical-quantity detection device which can reduce mounting variability of a circuit board.

Solution to Problem

To solve the above issue, a physical-quantity detection device according to the present invention includes a circuit board and a housing. The circuit board includes at least one detection unit to detect a physical quantity of a gas being measured that passes through a main channel, and a circuit unit to perform a computation on the physical quantity detected by the detection unit. The housing accommodates the circuit board. The housing is formed of a molded resin, and the circuit board is integrally formed together with the housing.

Advantageous Effects of Invention

According to the present invention, a circuit unit and a detection unit can be separately disposed by a simple structure, and mounting variability of a circuit board can be reduced. An issue, a configuration, and an effect other than the above are clarified by descriptions of embodiments to be described below.

BRIEF DESCRIPTION OF DRAWINGS

FIG. 2-1 is an elevation view of the physical-quantity detection device.

FIG. 2-2 is a back view of the physical-quantity detection device.

FIG. 2-3 is a left side view of the physical-quantity detection device.

FIG. 2-4 is a right side view of the physical-quantity detection device.

FIG. 2-5 is a plan view of the physical-quantity detection device.

FIG. 2-6 is a bottom view of the physical-quantity detection device.

FIG. 3-1 is an elevation view illustrating a state in which a front cover is removed from the physical-quantity detection device.

FIG. 3-2 is a back view illustrating a state in which a rear cover is removed from the physical-quantity detection device.

FIG. 3-3 is a left side view illustrating a state in which the front cover and the rear cover are removed from the physical-quantity detection device.

FIG. 3-4 is a right side view illustrating a state in which the front cover and the rear cover are removed from the physical-quantity detection device.

FIG. 3-5 is a sectional arrow view along line A-A illustrated in FIG. 3-1.

FIG. 4-1 is a back view describing another embodiment of a housing.

FIG. 4-2 is a right side view of the housing illustrated in FIG. 4-1.

FIG. 5 is a view describing a configuration of a front cover.

FIG. 6 is a view describing a configuration of a rear cover.

FIG. 7-1 is an elevation view of a circuit board.

FIG. 7-2 is a right side view of the circuit board

FIG. 7-3 is a back view of the circuit board.

FIG. 7-4 is a left side view of the circuit board

FIG. 7-5 is a sectional view on line C1-C1 illustrated in FIG. 7-1.

FIG. 7-6 is a view illustrating another embodiment corresponding to a cross-section on line C1-C1 illustrated in FIG. 7-1.

FIG. 7-7 is a sectional view on line C2-C2 in FIG. 7-1.

FIG. 8-1 is a view describing a structure of a sensor room. FIG. 8-1(a) is an enlarged view of the sensor room. FIG. 8-1(b) is a sectional view on line E1-E1 illustrated in FIG. 8-1(a).

FIG. 8-2 is a view describing a structure according to another embodiment of a sensor room. FIG. 8-2(a) is an enlarged view of the sensor room. FIG. 8-2(b) is a sectional view on line E2-E2 illustrated in FIG. 8-2(a).

FIG. 8-3 is a view describing a structure according to another embodiment of a sensor room. FIG. 8-3(a) is an enlarged view of the sensor room. FIG. 8-3(b) is a sectional view on line E3-E3 illustrated in FIG. 8-3(a).

FIG. 9-1 is an elevation view illustrating the other embodiment of a circuit board.

FIG. 9-2 is an elevation view illustrating the other embodiment of the circuit board.

FIG. 9-3 is an elevation view illustrating the other embodiment of the circuit board.

FIG. 9-4 is an elevation view illustrating the other embodiment of the circuit board.

FIG. 9-5 is an elevation view illustrating the other embodiment of the circuit board.

FIG. 9-6 is an elevation view illustrating the other embodiment of the circuit board.

FIG. 9-7 is an elevation view illustrating the other embodiment of the circuit board.

FIG. 9-8 is an elevation view illustrating the other embodiment of the circuit board.

FIG. 10-1 is a view describing a structure of a terminal connecting portion.

FIG. 10-2 is a view describing a structure of the terminal connecting portion.

FIG. 10-3 is a sectional view on line F-F illustrated in FIG. 10-1.

FIG. 10-4 is a sectional view on line G-G illustrated in FIG. 10-2.

FIG. 11-1 is a view describing an example of a circuit configuration of a physical-quantity detection device.

FIG. 11-2 is a view describing another embodiment of the circuit configuration of the physical-quantity detection device.

DESCRIPTION OF EMBODIMENTS

Figure 1:
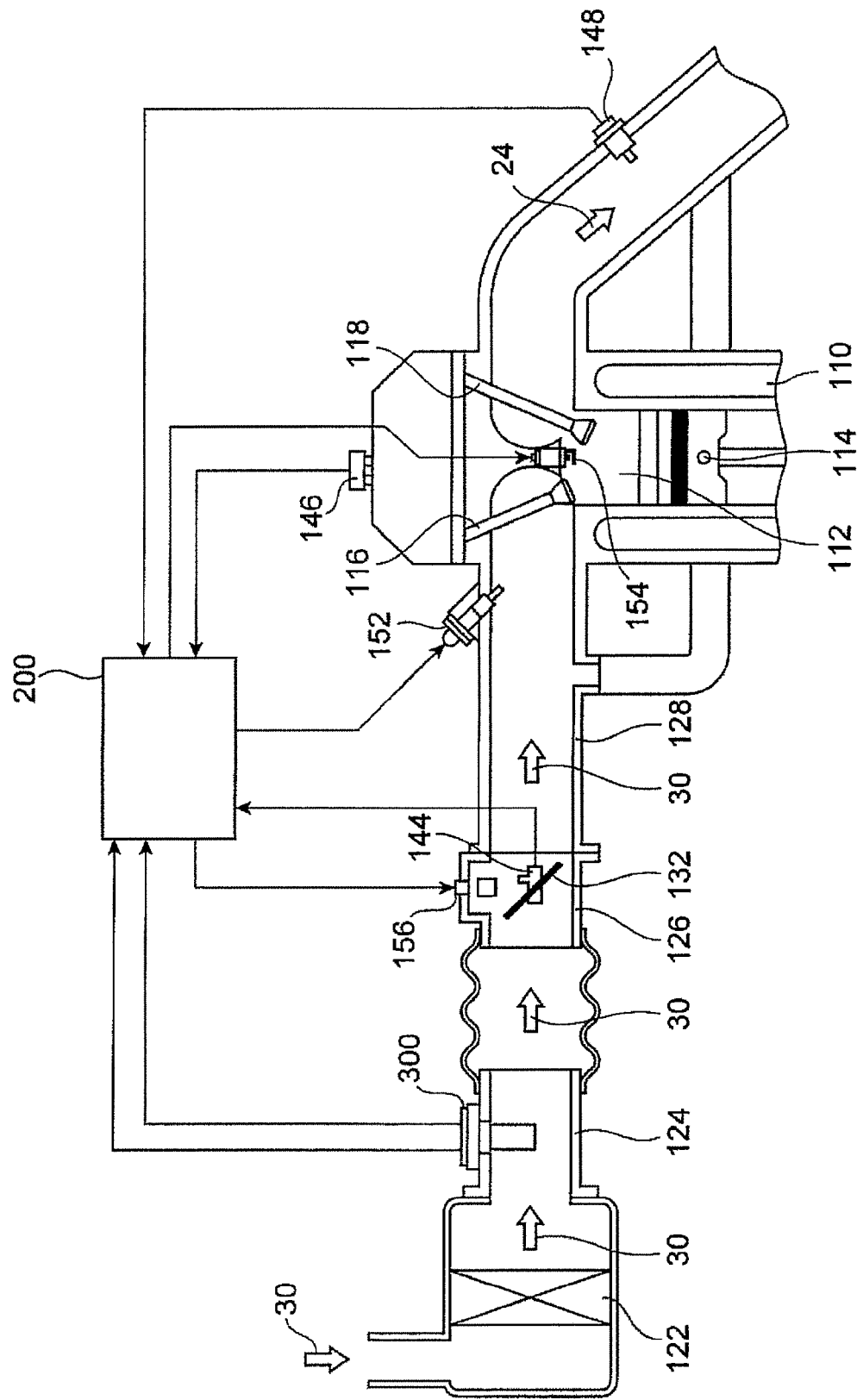
FIG. 1 is a system view illustrating one embodiment in which a physical-quantity detection device according to the present invention is used in an internal combustion engine control system.

Embodiments to perform the present invention, to be described below (hereinafter called embodiments) solve various issues required as an actual product, and especially solve various issues required for using as a detection device which detects a physical quantity of intake air in a vehicle, and consequently various effects are obtained. One of various issues solved in the embodiments to be described below is a content described in Technical Problem described above, and also one of various effects obtained in the embodiments to be described below is the effects described in Advantageous Effects of Invention. Various issues solved in the embodiments to be described below, and also various effects obtained by the embodiments will be described in the embodiments. Therefore, regarding issues and effects solved in the embodiments to be described below, contents other than contents in Technical Problem and Advantageous Effects of Invention will be described.

In the embodiments to be described below, same reference signs will indicate same configurations even if a drawing number is different, and same effects are obtained. Already described configurations are indicated by reference signs in the drawings, and descriptions thereof may be omitted.

1. Embodiment in which Physical-Quantity Detection Device According to Present Invention is Used in Internal Combustion Engine Control System FIG. 1 is a system view illustrating one embodiment in which a physical-quantity detection device according to the present invention is used in an electronic fuel injection-type internal combustion engine control system. On a basis of movement of an internal combustion engine 110 including an engine cylinder 112 and an engine piston 114, intake air is taken in from an air cleaner 122 as a gas being measured 30, and the intake air is introduced in a combustion chamber of the engine cylinder 112 via, for example, an intake body which is a main channel 124, a throttle body 126, and an intake manifold 128. A physical quantity of the gas being measured 30 which is intake air introduced in a combustion chamber is detected in a physical-quantity detection device 300 according to the present invention, fuel is supplied from a fuel injection valve 152 based on the detected physical quantity, and the fuel is introduced in the combustion chamber in a state of mixture with the intake air. In the embodiment, the fuel injection valve 152 is disposed to an intake port in an internal combustion engine, fuel injected to the intake port forms a mixture with the gas being measured 30 which is intake air, the fuel is introduced into a combustion chamber via an intake valve 116, and the fuel burns and generates mechanical energy.

The fuel and air introduced in the combustion chamber is in a state in which the fuel and the air are mixed. The fuel and the air explosively burn by spark ignition of an ignition plug 154 and generate mechanical energy. The gas after burning is introduced from an exhaust valve 118 to an exhaust pipe and discharged as an exhaust gas 24 from the exhaust pipe to the outside of a vehicle. A fuel amount of the gas being measured 30 which is intake air introduced into the combustion chamber is controlled by a throttle valve 132 in which an opening angle is changed based on an operation of an accelerator pedal. A fuel supply amount is controlled based on a flow rate of the intake air to be introduced into the combustion chamber, and a driver controls a flow rate of the intake air introduced into the combustion chamber by controlling an opening of the throttle valve 132. Consequently, the driver can control mechanical energy generated in the internal combustion engine.

1.1 Summary of Control of Internal Combustion Engine Control System

A physical quantity including a flow rate, a temperature, humidity, and a pressure, of the gas being measured 30 which is intake air taken from the air cleaner 122 and flowing in the main channel 124 is detected by the physical-quantity detection device 300, and an electric signal indicating the physical quantity of the intake air is input from the physical-quantity detection device 300 to a control device 200. Further, an output of a throttle angle sensor 144 which measures an opening of the throttle valve 132 is input to the control device 200. In addition, positions and states of the engine piston 114, the intake valve 116, and the exhaust valve 118 in an internal combustion engine is input to the control device 200, and also an output of a rotation angle sensor 146 is input to the control device 200 to measure a rotation speed of the internal combustion engine. To measure a state of a mixture ratio between a fuel amount and an air amount from a state of the exhaust gas 24, an output of an oxygen sensor 148 is input to the control device 200.

The control device 200 computes a fuel injection amount and an ignition timing based on a physical quantity of an intake air which is an output of the physical-quantity detection device 300 and a rotation speed of an internal combustion engine, measured based on an output of the rotation angle sensor 146. On a basis of a computation result, an amount of fuel supplied from the fuel injection valve 152, and also the ignition timing by the ignition plug 154 is controlled. Actually, the fuel supply amount and the ignition timing are finely controlled also based on a change state of a temperature and a throttle angle detected by the physical-quantity detection device 300, a change state of an engine rotation speed, and a state of an air fuel ratio measured by the oxygen sensor 148. The control device 200 also controls an air amount bypassing in the throttle valve 132 by an idle air control valve 156 during an idling operation of an internal combustion engine, and the control device 200 controls a rotation speed of the internal combustion engine in an idling operation.

1.2 Importance of Detection Accuracy Improvement and Mounting Environment of Physical-Quantity Detection Device Both of an ignition timing and a fuel supply amount which is a major control amount in an internal combustion engine are computed by using an output of the physical-quantity detection device 300 as a main parameter. Therefore, improving detection accuracy of the physical-quantity detection device 300, suppressing a change with time, and improving reliability are important for improving control accuracy of a vehicle and securing reliability.

Especially, in recent years, a request regarding fuel saving of a vehicle is increased, and also a request regarding exhaust gas purification is increased. To respond these requests, improving detection accuracy of a physical quantity of intake air detected by the physical-quantity detection device 300 is significantly important. In addition, it is important that the physical-quantity detection device 300 maintains high reliability.

A vehicle mounting the physical-quantity detection device 300 is used in an environment in which a temperature and humidity are significantly changed. The physical-quantity detection device 300 preferably corresponds to a change in a temperature and humidity in the use environment and corresponds to dusts and contaminants.

The physical-quantity detection device 300 is mounted to an intake pipe affected by heat from an internal combustion engine. Therefore, the heat generated in the internal combustion engine is transmitted to the physical-quantity detection device 300 via the intake pipe which is the main channel 124. The physical-quantity detection device 300 detects a flow rate of the gas being measured 30 by transferring heat to and from the gas being measured 30, and therefore it is important to suppress as much as possible an influence by heat from the outside.

As described below, the physical-quantity detection device 300 mounted in a vehicle solves issues described in Technical Problem and obtains effects described in Advantageous Effects of Invention. In addition, as described below, various issues described above are sufficiently considered, various issues required as a product are solved, and various effects are obtained. Specific issues solved and specific effects obtained by the physical-quantity detection device 300 will be described in embodiments to be described below.

2. Configuration of Physical-Quantity Detection Device 300

2.1 External Structure of Physical-Quantity Detection Device 300

Figures 1, 2:
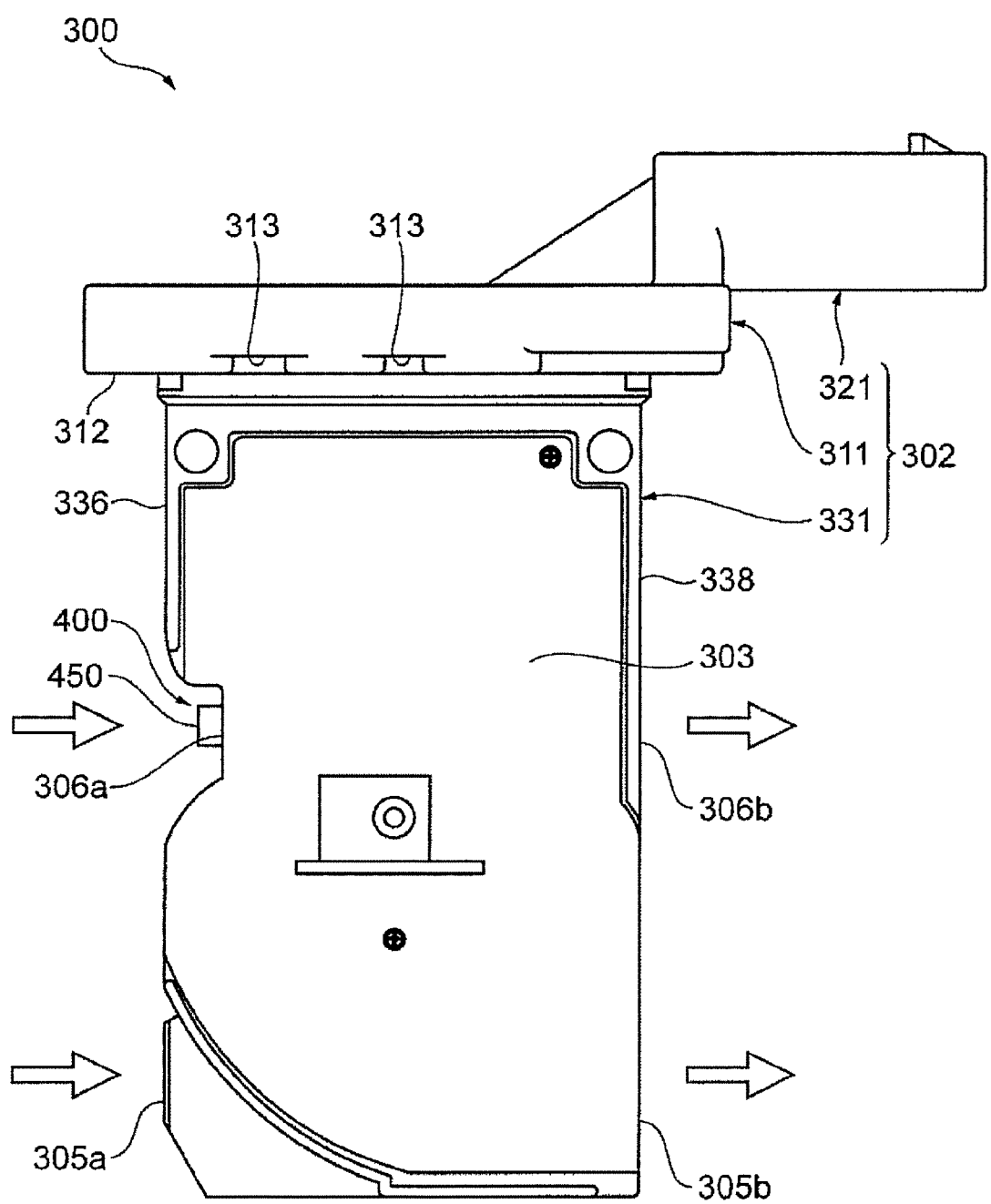
Figure 2:
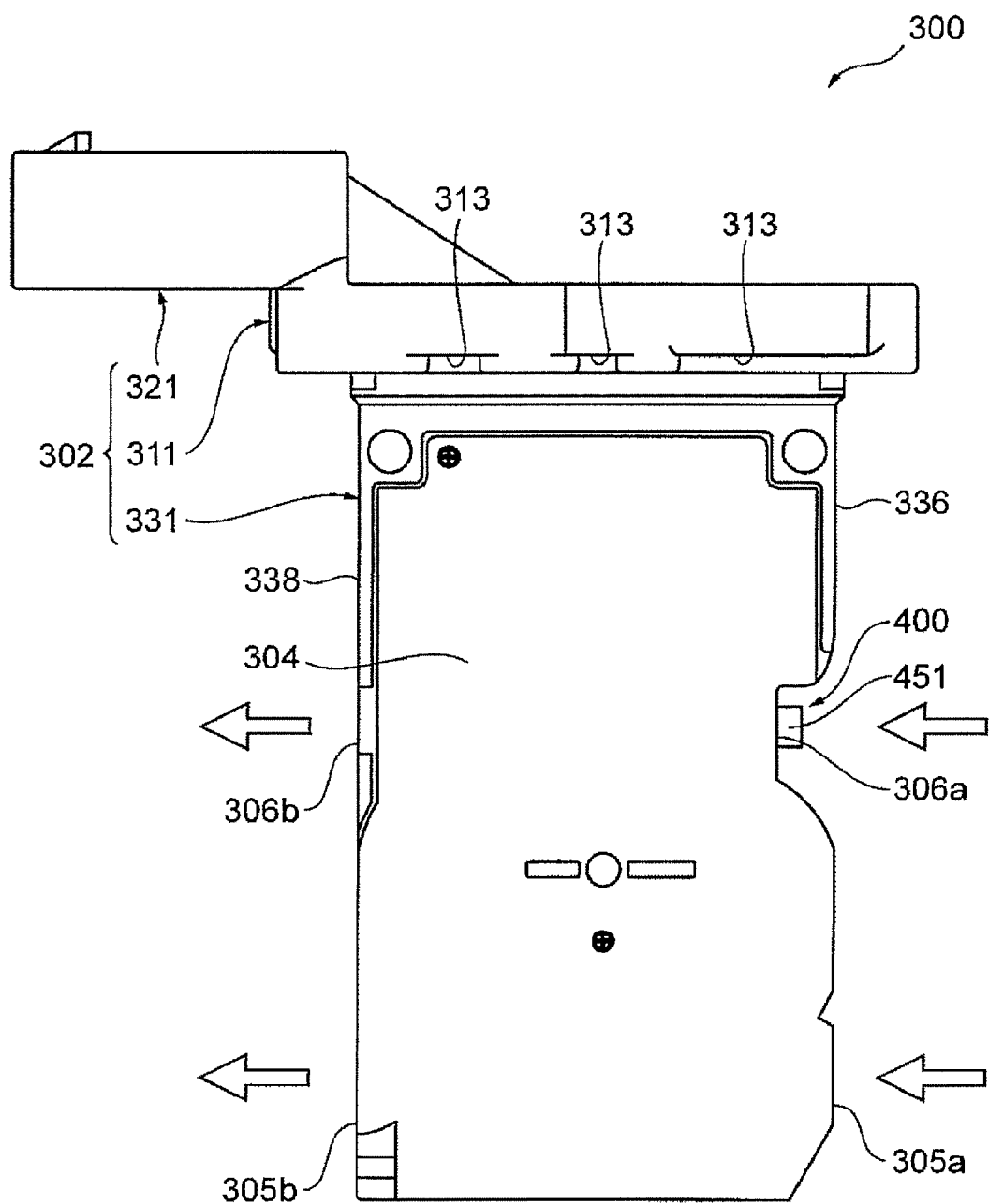
Figures 2, 3:
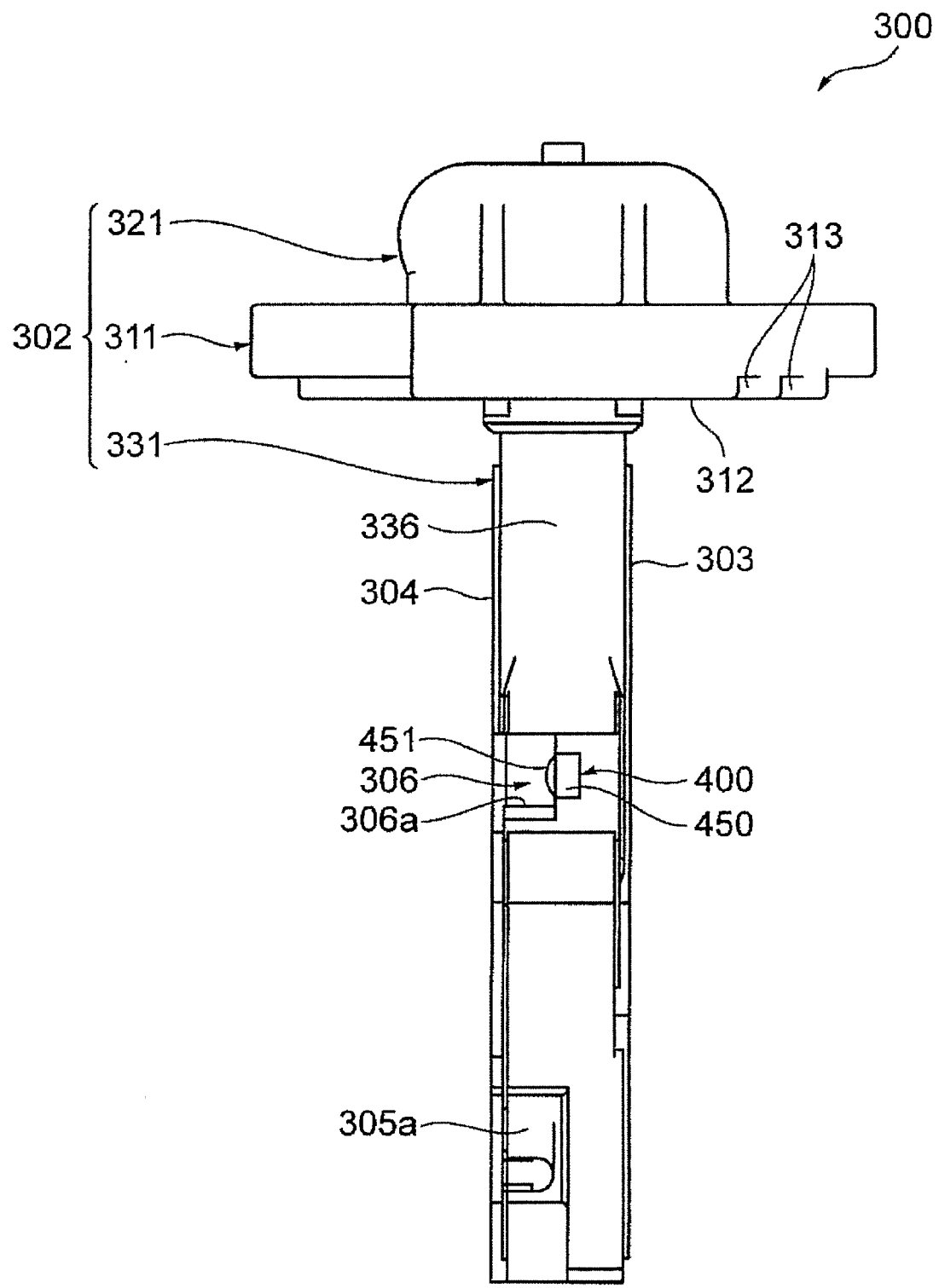
Figures 2, 3, 4:
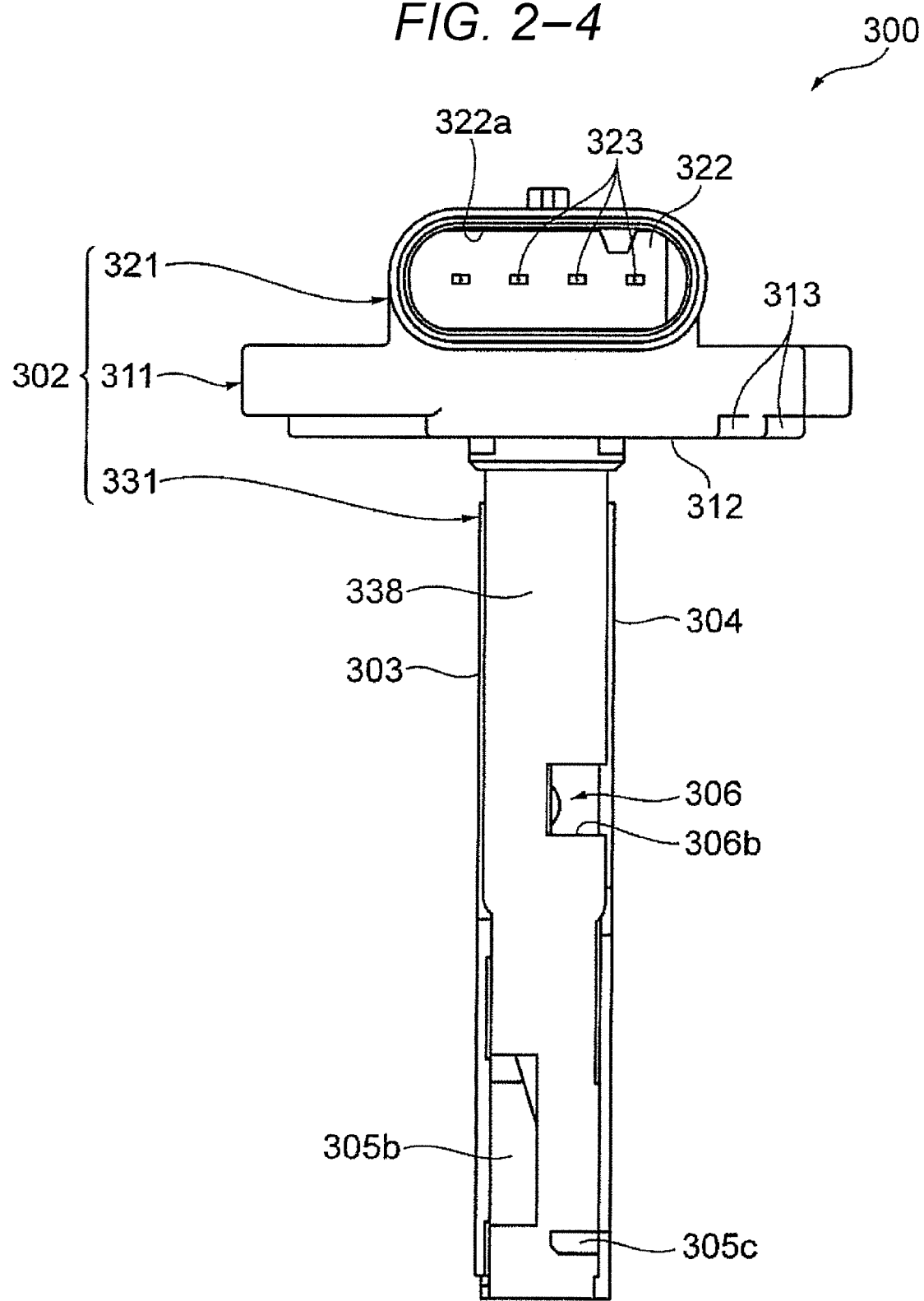

FIGS. 2-1 to 2-6 are views illustrating an external appearance of the physical-quantity detection device 300. FIG. 2-1 is an elevation view of the physical-quantity detection device 300. FIG. 2-2 is a back view. FIG. 2-3 is a left side view. FIG. 2-4 is a right side view. FIG. 2-5 is a plan view. FIG. 2-6 is a bottom view.

The physical-quantity detection device 300 includes a housing 302, a front cover 303, and a rear cover 304. The housing 302 is formed by molding a synthetic resin material. The housing 302 includes a flange 311, a connection to an external system 321, and a measuring unit 331. The flange 311 fixes the physical-quantity detection device 300 to an intake body which is the main channel 124. The connection to an external system 321 projects from the flange 311 and includes a connector to electrically connect to an external machine. The measuring unit 331 extends so as to project from the flange 311 to a center of the main channel 124.

In the measuring unit 331, the circuit board 400 is integrally provided by insert mold when the housing 302 is molded (refer to FIGS. 3-1 and 3-2). The circuit board 400 includes at least one detection unit to detect a physical quantity of the gas being measured 30 flowing in the main channel 124 and a circuit unit to process a signal detected in the detection unit. The detection unit is disposed at a position exposed by the gas being measured 30. The circuit unit is disposed in a circuit room sealed by the front cover 303.

A bypass passage groove is disposed on a front surface and a back surface of the measuring unit 331, and a first bypass passage 305 is formed by the cooperation between the front cover 303 and the rear cover 304. A first bypass passage inlet 305a and a first bypass passage outlet 305b are disposed at a tip of the measuring unit 331. The first bypass passage inlet 305a takes a part of the gas being measured 30 such as intake air in the first bypass passage 305. The first bypass passage outlet 305b returns the gas being measured 30 from the first bypass passage 305 to the main channel 124. A part of the circuit board 400 is exposed in the middle of a passage of the first bypass passage 305. A detection unit of air flow 602 (refer to FIG. 3-1) which is a detection unit is disposed in the exposed portion, and a flow rate of the gas being measured 30 is detected.

In the middle portion of the measuring unit 331 on the flange 311 side from the first bypass passage 305, a second bypass passage 306 is provided to take a part of the gas being measured 30 including intake air into a sensor room Rs. The second bypass passage 306 is formed by the cooperation between the measuring unit 331 and the rear cover 304. The second bypass passage 306 includes the second bypass passage inlet 306a and the second bypass passage outlet 306b. The second bypass passage inlet 306a opens on an outer wall at upstream 336 to take in the gas being measured 30. The second bypass passage outlet 306b opens on an outer wall at downstream 338 to return the gas being measured 30 from the second bypass passage 306 to the main channel 124. The second bypass passage 306 communicates with the sensor room Rs formed on a back side of the measuring unit 331. The sensor room Rs includes a pressure sensor and a humidity sensor which are a detection unit disposed on a back surface of the circuit board 400.

2.2 Effects Based on External Structure of Physical-Quantity Detection Device 300

In the physical-quantity detection device 300, the second bypass passage inlet 306a is disposed in a middle portion of the measuring unit 331 extending from the flange 311 toward a center direction of the main channel 124, and a first bypass passage inlet 305a is disposed at a tip portion of the measuring unit 331. Therefore, the physical-quantity detection device 300 can take a gas near a center portion apart from an inner wall surface of the main channel 124, not near the inner wall surface, into each of the first bypass passage 305 and the second bypass passage 306. Accordingly, the physical-quantity detection device 300 can measure a physical quantity of a gas in a portion apart from an inner wall surface of the main channel 124 and can reduce a measuring error of the physical quantity related to heat and a decrease in a flow speed near the inner wall surface.

The measuring unit 331 has a shape extending along a shaft toward a center from an outer wall of the main channel 124, and a thickness width thereof is narrow as illustrated in FIGS. 2-3 and 2-4. That is, in the measuring unit 331 of the physical-quantity detection device 300, a side width is thin, and a front surface has a substantially rectangular shape. As a result, the physical-quantity detection device 300 can include the first bypass passage 305 having a sufficient length, and a fluid resistance with respect to the gas being measured 30 can be reduced to a small resistance. Therefore, the physical-quantity detection device 300 can highly accurately measure a flow rate of the gas being measured 30 while reducing the flow resistance.

2.3 Structure and Effect of Flange 311

A plurality of dents 313 are disposed on a lower surface 312 opposing the main channel 124 in the flange 311. The dents reduce a heat transferring surface between the main channel 124 and the flange 311, and the physical-quantity detection device 300 is not easily affected by heat. The measuring unit 331 is inserted into the physical-quantity detection device 300 from a mounting hole disposed on the main channel 124, and a lower surface 312 of the flange 311 opposes the main channel 124. The main channel 124 is, for example, an intake body and often maintained at a high temperature. On the other hand, a temperature in the main channel 124 is extremely low when the physical-quantity detection device 300 starts operation in a cold district. When a high temperature state and a low temperature state of the main channel 124 affect the measurement of various physical quantities, measurement accuracy is decreased. The flange 311 includes the dent 313 on the lower surface 312, and a space is formed between the lower surface 312 opposing the main channel 124 and the main channel 124. Therefore, heat transfer from the main channel 124 with respect to the physical-quantity detection device 300 is reduced, and a decrease in the measuring accuracy by heat can be prevented.

Screw holes 314 of the flange 311 are for fixing the physical-quantity detection device 300 to the main channel 124, and a space is formed between a surface opposing the main channel 124 around each screw hole 314 and the main channel 124 such that the surface opposing the main channel 124 around these screw holes 314 is disposed apart from the main channel 124. In this manner, heat transfer from the main channel 124 with respect to the physical-quantity detection device 300 is reduced, and a decrease in measuring accuracy by heat can be prevented.

2.4 Structure of Connection to External System 321

The connection to an external system 321 includes a connector 322. The connector 322 is disposed on an upper surface of the flange 311 and projected from the flange 311 toward a downstream side in a flowing direction of the gas being measured 30. The connector 322 includes an insertion hole 322a to insert a communication cable to connect between the control device 200 and the connector 322. As illustrated in FIG. 2-4, four external terminals 323 are provided in the insertion hole 322a. The external terminal 323 is a terminal for outputting physical quantity information which is a measurement result of the physical-quantity detection device 300 and a power source terminal for supplying DC power to operate the physical-quantity detection device 300.

The connector 322 has a shape projecting from the flange 311 toward a downstream side in a flowing direction of the gas being measured 30 and inserting from the downstream side in a flowing direction to the upstream side. However, the shape is not limited thereto. The connector 322 may have, for example, a shape vertically projecting from an upper surface of the flange 311 and inserting along an extending direction of the measuring unit 331, and various changes are available.

3. Overall Structure and Effects of Housing 3.1 Overall Structure of Housing 302

Figures 2, 3, 4, 5:
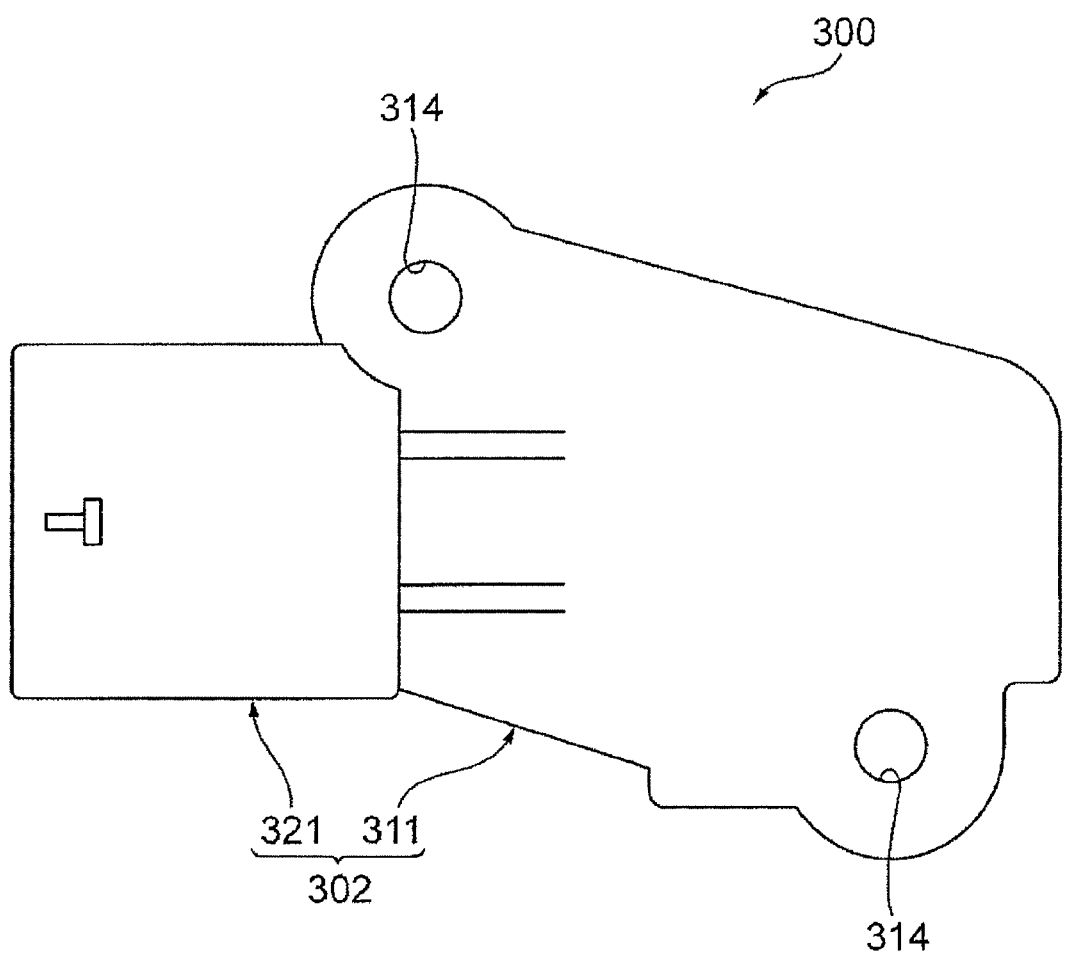

Next, regarding an overall structure of the housing 302 will be described with reference to FIGS. 3-1 to 3-5. FIGS. 3-1 to 3-5 are views illustrating a state of the housing 302 in which the front cover 303 and the rear cover 304 are removed from the physical-quantity detection device 300. FIG. 3-1 is an elevation view of the housing 302. FIG. 3-2 is a back view of the housing 302. FIG. 3-3 is a left side view of the housing 302. FIG. 3-4 is a right side view of the housing 302. FIG. 3-5 is a sectional arrow view along line A-A illustrated in FIG. 3-1.

In the housing 302, the measuring unit 331 extends from the flange 311 toward a center of the main channel 124. The circuit board 400 is insert-molded on a base end side of the measuring unit 331. The circuit board 400 is disposed in parallel to a surface of the measuring unit 331 at a center between a front surface and a back surface of the measuring unit 331 and integrally molded to the housing 302. The circuit board 400 divides the base end side of the measuring unit 331 into one side and another side in a thickness direction.

The circuit room Rc accommodating a circuit unit of the circuit board 400 is formed on a front surface side of the measuring unit 331, and the sensor room Rs accommodating the pressure sensor 421 and the humidity sensor 422 is formed on a back surface side. The circuit room Rc is sealed by attaching the front cover 303 to the housing 302 and totally separated from the outside. On the other hand, by attaching the rear cover 304 to the housing 302, the second bypass passage 306 and the sensor room. Rs which is a room space for communicating with the outside of the measuring unit 331 via the second bypass passage 306 are formed. A part of the circuit board 400 is projected in the first bypass passage 305 from a dividing wall 335 dividing between the circuit room Rc of the measuring unit 331 and the first bypass passage 305, and the detection unit of air flow 602 is disposed on a front surface of main air flow 430 in the projected portion.

3.2 Structure of Bypass Passage Groove

A bypass passage groove is disposed on a tip side in a longitudinal direction of the measuring unit 331 to mold the first bypass passage 305. The bypass passage groove to form the first bypass passage 305 includes a groove of a bypass passage at a front side 332 illustrated in FIG. 3-1 and a groove of a bypass passage at a back side 334 illustrated in FIG. 3-2. As illustrated in FIG. 3-1, as the groove of a bypass passage at a front side 332 is gradually curved on the flange 311 side which is a base end side of the measuring unit 331 as shifting from the first bypass passage outlet 305b opening to the outer wall at downstream 338 of the measuring unit 331 toward the outer wall at upstream 336, and the groove of a bypass passage at a front side 332 communicates with an aperture 333 penetrating the measuring unit 331 in a thickness direction at a position near the outer wall at upstream 336. The aperture 333 is formed along a flow direction of the gas being measured 30 in the main channel 124 so as to extend between the outer wall at upstream 336 and the outer wall at downstream 338.

As illustrated in FIG. 3-2, the groove of a bypass passage at a back side 334 shifts from the outer wall at upstream 336 to the outer wall at downstream 338 and is divided into two at a center position between the outer wall at upstream 336 and the outer wall at downstream 338. One side opens to a discharge port 305c of the outer wall at downstream 338 by linearly extending as an exhaust passage. Another side is gradually curved on the flange 311 side which is a base end side of the measuring unit 331 as shifting to the outer wall at downstream 338 and communicates with the aperture 333 at a position near the outer wall at downstream 338.

The groove of a bypass passage at a back side 334 forms an inlet groove into which the gas being measured 30 flows from the main channel 124. The groove of a bypass passage at a front side 332 forms an outlet groove to return, to the main channel 124, the gas being measured 30 taken from the groove of a bypass passage at a back side 334. The groove of a bypass passage at a front side 332 and the groove of a bypass passage at a back side 334 are disposed at a tip portion of the housing 302. Therefore, a gas in a portion apart from the inner wall surface of the main channel 124, in other words, a gas flowing in a portion near the center of the main channel 124, can be taken as the gas being measured 30. The gas flowing near the inner wall of the main channel 124 is affected by a wall surface temperature of the main channel 124 and therefore often has a temperature different from an average temperature of a gas flowing in the main channel 124 such as intake air. The gas flowing near the inner wall of the main channel 124 often has a flow speed slower than an average speed of the gas flowing in the main channel 124. The physical-quantity detection device 300 according to the embodiments is not easily affected and can suppress a decrease in measurement accuracy.

As illustrate in FIG. 3-2, apart of the gas being measured 30 flowing in the main channel 124 is taken from the first bypass passage inlet 305*a* in the groove of a bypass passage at a back side 334, and flows in the groove of a bypass passage at a back side 334. Then, a foreign substance having a large mass included in the gas being measured 30 flows into an exhaust passage linearly extending from a branch with a part of the gas being measured and discharged from the discharge port 305*c* of the outer wall at downstream 338 to the main channel 124.

A depth of the groove of a bypass passage at a back side 334 is increased gradually, and the gas being measured 30 gradually moves to a front side of the measuring unit 331 as flowing along the groove of a bypass passage at a back side 334. Especially, in the groove of a bypass passage at a back side 334, a rapid slope portion 334*a* is provided in which a depth is rapidly increased just before the aperture 333. A part of air having a small mass moves long the rapid slope portion 334*a* and flows on the front surface of main air flow 430 side of the circuit board 400 in the aperture 333. On the other hand, a moving direction of a foreign substance having a large mass is not easily rapidly changed, and therefore the foreign substance flows on a side of the back surface of main air flow 431.

As illustrated in FIG. 3-1, the gas being measured 30 moved on the front side of the aperture 333 flows along the front surface of main air flow 430 of a circuit board, heat is transferred to and from the detection unit of air flow 602 disposed on the front surface of main air flow 430, and a flow rate is measured. Air flowing from the aperture 333 to the groove of a bypass passage at a front side 332 flows along the groove of a bypass passage at a front side 332 and discharged from the first bypass passage outlet 305*b* opening on the outer wall at downstream 338 to the main channel 124.

Substances having a large mass such as dusts mixed in the gas being measured 30 has a large inertia force. Therefore, it is difficult to rapidly change a moving direction in a depth direction of a groove along a front surface of the rapid slope portion 334*a* in which the groove depth rapidly increases. Therefore, substances having a large mass move on the back surface of main air flow 431 side, and it is prevented that the substances pass near the detection unit of air flow 602. In the embodiment, many substances having a large mass other than gas pass through the back surface of main air flow 431 which is a back surface of the front surface of main air flow 430. Therefore, influence by dirt by substances such as oil, carbon, and dusts can be reduced, and a decrease in measuring accuracy can be suppressed. That is, a moving direction of the gas being measured 30 can be rapidly changed along an axis crossing a flow axis of the main channel 124, and therefore the influence by substances mixed in the gas being measured 30 can be reduced.

3.3 Structure and Effect of Second Bypass Passage and Sensor Room

The second bypass passage 306 is linearly formed over between the second bypass passage inlet 306*a* and the second bypass passage outlet 306*b* in parallel with the flange 311 along a flow direction of the gas being measured 30. The second bypass passage inlet 306*a* is formed by cutting out a part of the outer wall at upstream 336, and the second bypass passage outlet 306*b* is formed by cutting out a part of the outer wall at downstream 338. Specifically, as illustrated in FIG. 3-3, at a continuous position along an upper surface of the dividing wall 335, a part of the outer wall at upstream 336 and a part of the outer wall at downstream 338 are cut out from a back surface side of the measuring unit 331. The second bypass passage inlet 306*a* and the second bypass passage outlet 306*b* are cut out to a depth position flush with a back surface of the circuit board 400. In the second bypass passage 306, the gas being measured 30 passes through along the back surface of a board body 401 of the circuit board 400 and therefore functions as a cooling channel to cool the board body 401. Many of the circuit boards 400 are heated like an LSI and a microprocessor, and the heat of them is transferred to the back surface of the board body 401 and released by the gas being measured 30 passing through the second bypass passage 306.

The sensor room Rs is disposed on a base end side of the measuring unit 331 from the second bypass passage 306. A part of the gas being measured 30 flowing from the second bypass passage inlet 306*a* into the second bypass passage 306 flows into the sensor room Rs, and a pressure and a relative humidity are detected by each of the pressure sensor 421 and the humidity sensor 422 in the sensor room Rs. The humidity sensor 422 also detects a temperature. The sensor room Rs is disposed on a base end side of the measuring unit 331 from the second bypass passage 306, and therefore influence by dynamic pressure of the gas being measured 30 passing through the second bypass passage 306 can be reduced. Therefore, detection accuracy of the pressure sensor 421 in the sensor room Rs can be improved.

Then, since the sensor room Rs is disposed on a base end side of the measuring unit 331 from the second bypass passage 306, for example, in the case where a tip side of the measuring unit 331 is mounted on an intake passage in a downward posture, it is prevented that contaminants and water drops flowed into the second bypass passage 306 with the gas being measured 30 are attached to the pressure sensor 421 and the humidity sensor 422 disposed on a downstream side of the pressure sensor 421.

Especially, in the embodiments, the relatively large-sized pressure sensor 421 is disposed on an upstream side in the sensor room Rs, and the relatively small-sized humidity sensor 422 is disposed on a downstream side of the pressure sensor 421. Therefore, contaminants and water drops flowed in with the gas being measured 30 are attached to the pressure sensor 421, and it is suppressed to attach to the humidity sensor 422. Therefore, the humidity sensor 422 having a low resistance to contaminants and water drops can be protected.

The pressure sensor 421 and the humidity sensor 422 are not easily affected by flow of the gas being measured 30 in comparison with the detection unit of air flow 602. Especially, the humidity sensor 422 secures at least a water diffusion level in the gas being measured 30, and therefore the humidity sensor 422 can be disposed in the sensor room Rs adjacent to the linear second bypass passage 306. In response, the detection unit of air flow 602 needs a certain flow speed or more, also dusts and contaminants need to be away from the detection unit of air flow 602, and influence on pulsation needs to be considered. Therefore, the detection unit of air flow 602 is provided on the first bypass passage 305 having a shape circulating like a loop.

FIGS. 4-1 and 4-2 are views illustrating another embodiment of the second bypass passage. In the embodiment, instead of cutting out the outer wall at upstream 336 and the outer wall at downstream 338, the second bypass passage inlet 306a and the second bypass passage outlet 306b are formed by providing a through hole 337 on the outer wall at upstream 336 and the outer wall at downstream 338. As with the second bypass passage illustrated in FIGS. 3-2 to 3-5 described above, in the case where the second bypass passage inlet 306a and the second bypass passage outlet 306b are formed by cutting out each of the outer wall at upstream 336 and the outer wall at downstream 338, a width of the outer wall at upstream 336 and a width of the outer wall at downstream 338 are locally narrowed at a certain position. Therefore, the measuring unit 331 may be warped substantially in a dog-leg shape from a notch as a starting point by heat left during molding. According to the embodiment, since a through hole is provided instead of a notch, it can be prevented that the measuring unit 331 is bent substantially in a dog leg shape. Therefore, it is prevented that detection accuracy is affected by changing a position and a direction of a detection unit with respect to the gas being measured 30 by a bending of the housing 302, and constant detection accuracy can be secured without an individual difference.

FIGS. 8-1, 8-2, and 8-3 are views illustrating another embodiment of the second bypass passage. A defining wall which divides between the second bypass passage 306 and the sensor room Rs may be provided on the rear cover 304. According to such the configuration, the gas being measured 30 can be indirectly flowed from the second bypass passage 306 into the sensor room Rs, and influence by dynamic pressure with respect to a pressure sensor can be reduced, and attachment of contaminants and water drops to a humidity sensor can be suppressed.

Figures 1, 8:
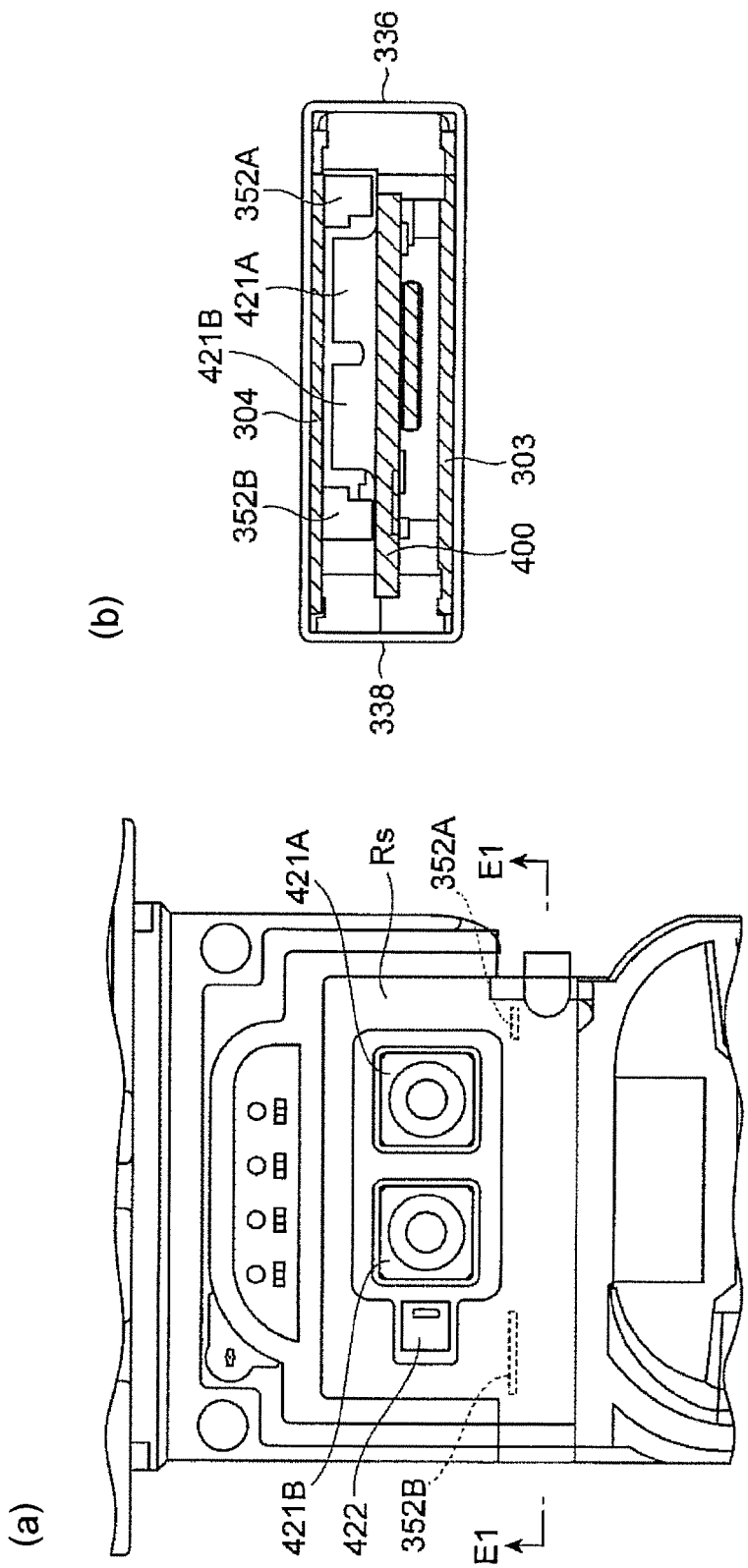
Figures 2, 8:
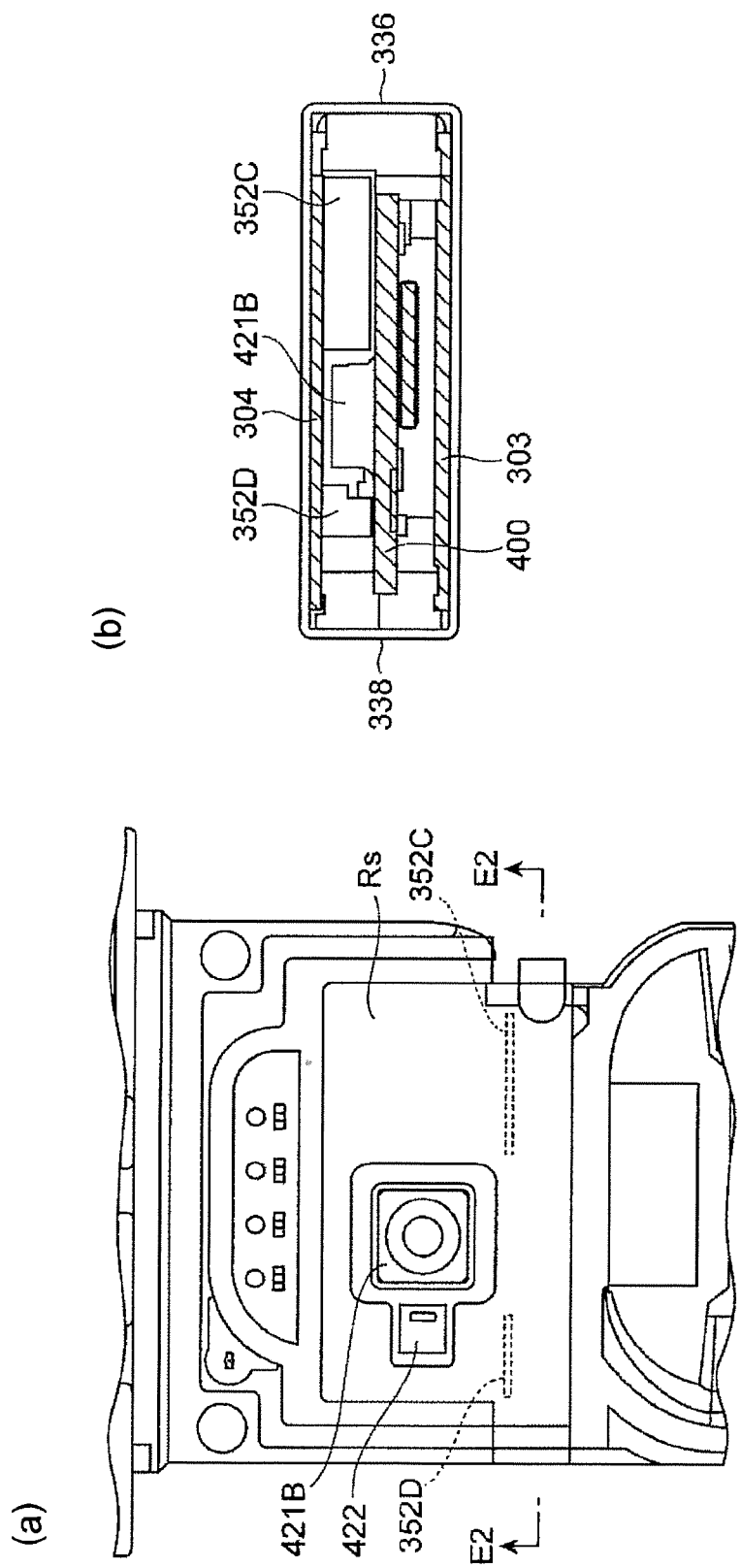
Figures 3, 8:
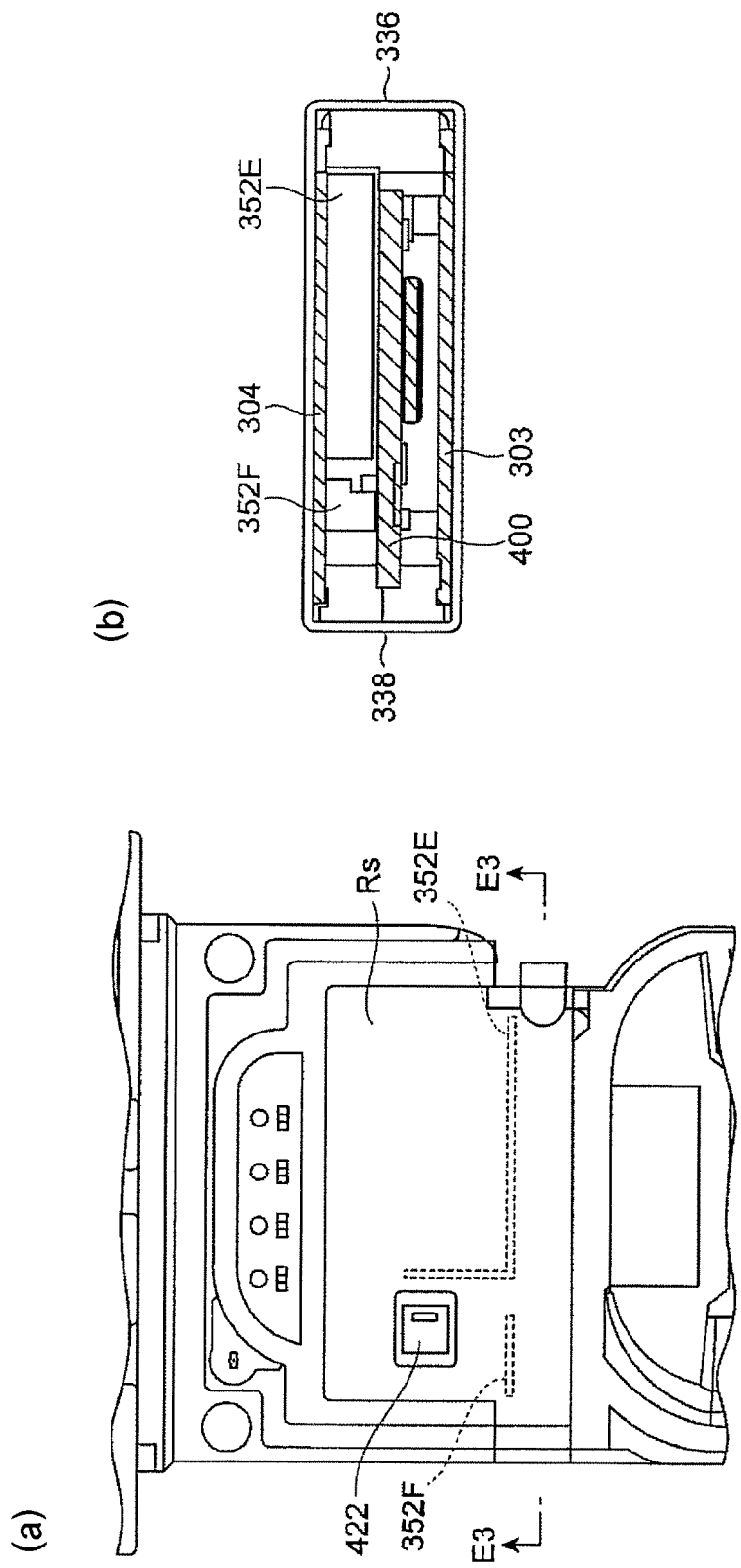

In the example illustrated in FIG. 8-1, two pressure sensors 421A and 421B are disposed in line along the second bypass passage 306 in the sensor room Rs, and one humidity sensor 422 is disposed on a downstream side. Defining walls 352A and 352B are disposed on the rear cover 304 and disposed so as to extend between the second bypass passage 306 and the sensor room Rs by mounting the housing 302 to the rear cover 304. Specifically, the defining wall 352A is disposed between the pressure sensor 421A on an upstream side and an upstream side wall of the sensor room Rs, and the defining wall 352B is disposed along the humidity sensor 422 over between the pressure sensor 421B on a downstream side and a downstream side wall of the sensor room Rs.

In the example illustrated in FIG. 8-2, the pressure sensor 421B on the downstream side is disposed, and the pressure sensor 421A on the upstream side is omitted. Therefore, the defining wall 352C is extended by the length of the pressure sensor 421A. The defining wall 352D on the downstream side is disposed along the humidity sensor 422 over between the pressure sensor 421B on the downstream side and a downstream side wall of the sensor room Rs as with the defining wall 352B in FIG. 8-1. Therefore, on the defining walls 352A and 352C, the gas being measured 30 does not directly attach to the pressure sensor, and influence by dynamic pressure can be reduced. In addition, the defining walls 352B and 352D can suppress that contaminants and water drops attach to the humidity sensor 422.

In the embodiment illustrated in FIG. 8-3, both of two pressure sensors 421A and 421B are omitted, and one humidity sensor 422 is disposed in the sensor room Rs. The defining wall 352E on an upstream side extends to an upstream position of the humidity sensor 422 from an upstream side wall of the sensor room Rs along between the second bypass passage 306 and the sensor room Rs. The defining wall 352E has a substantial L-shape opposing on an upstream side of the humidity sensor 422 by being bent at a downstream end. A defining wall 352F is disposed along the humidity sensor 422 over between a pressure sensor on a downstream side and a downstream side wall of the sensor room Rs as with the defining walls 352B and 352D. Therefore, the defining wall 352E prevents that contaminants and water drops included in the gas being measured 30 passing through the second bypass passage 306 move toward the humidity sensor 422 and protects the humidity sensor 422 from such contaminants and others.

3.4 Shapes and Effects of Front Cover 303 and Rear Cover 304

Figures 2, 3, 4, 5, 6:
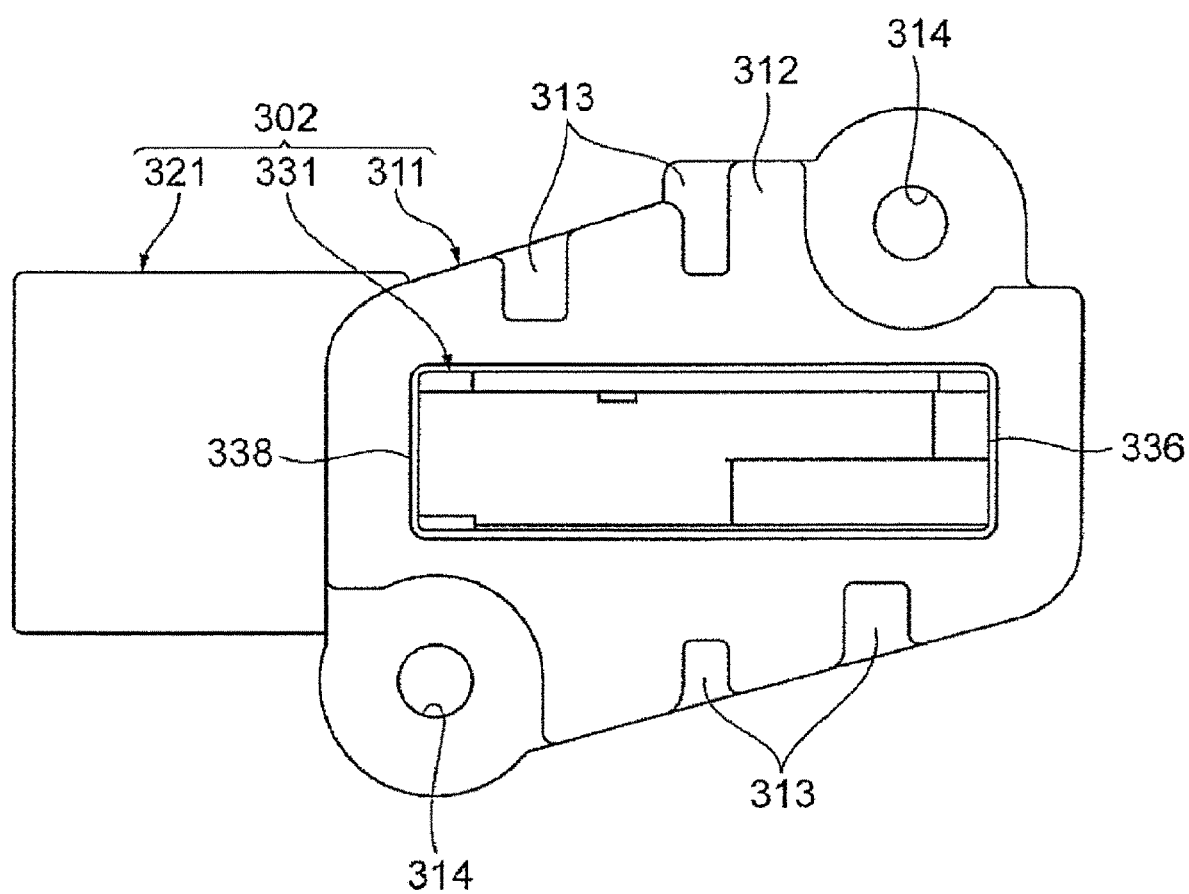
Figures 1, 3:
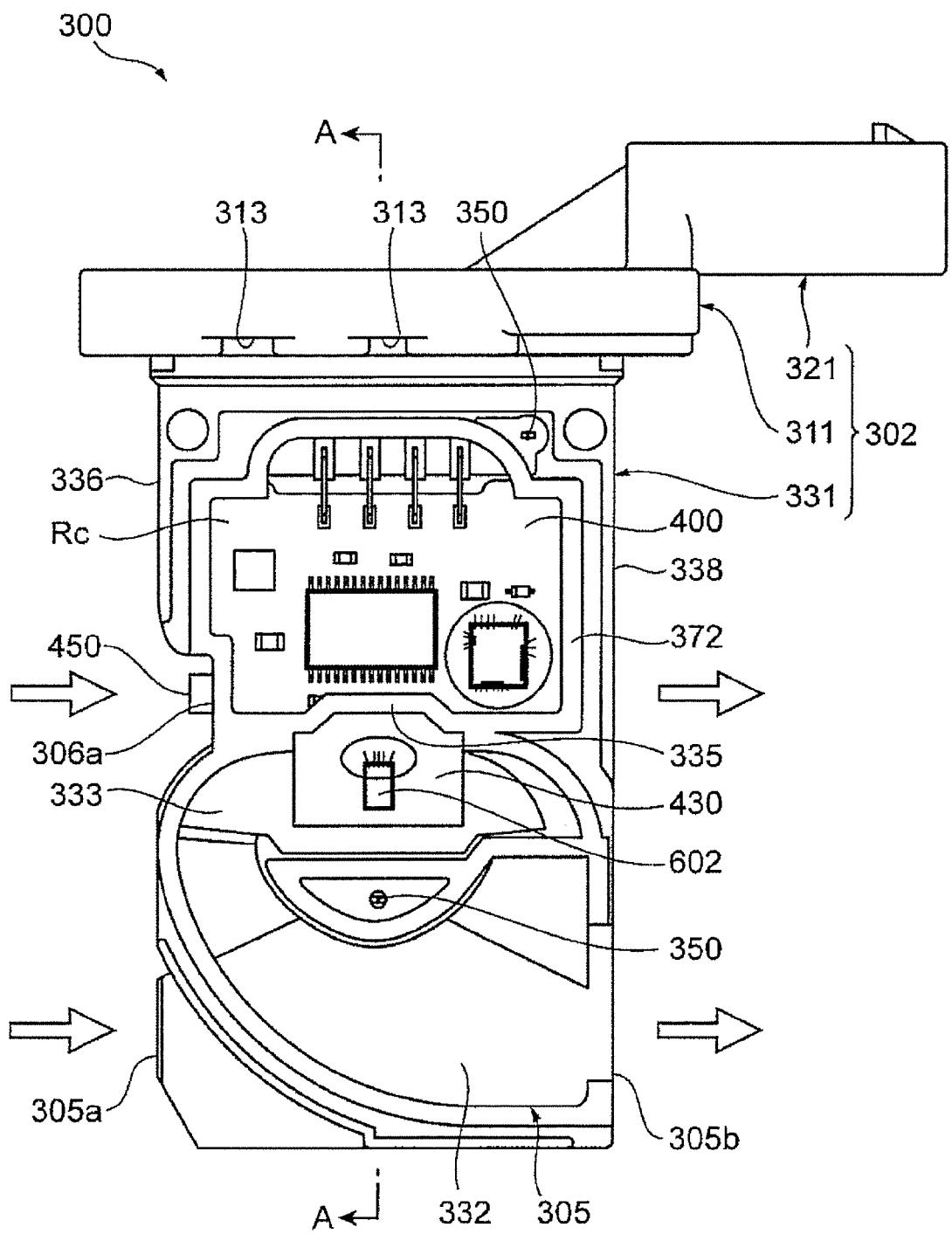
Figures 2, 3:
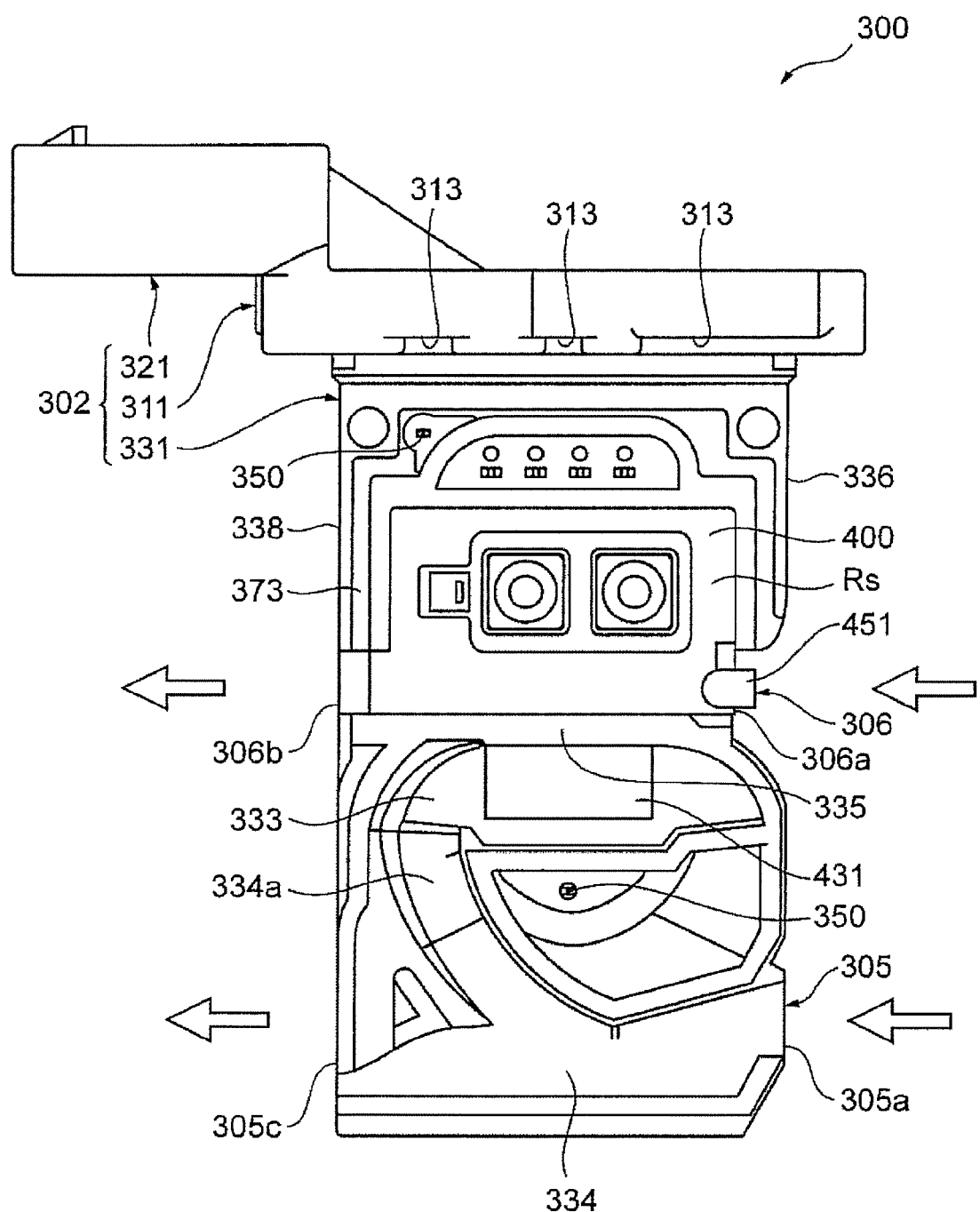
Figure 3:
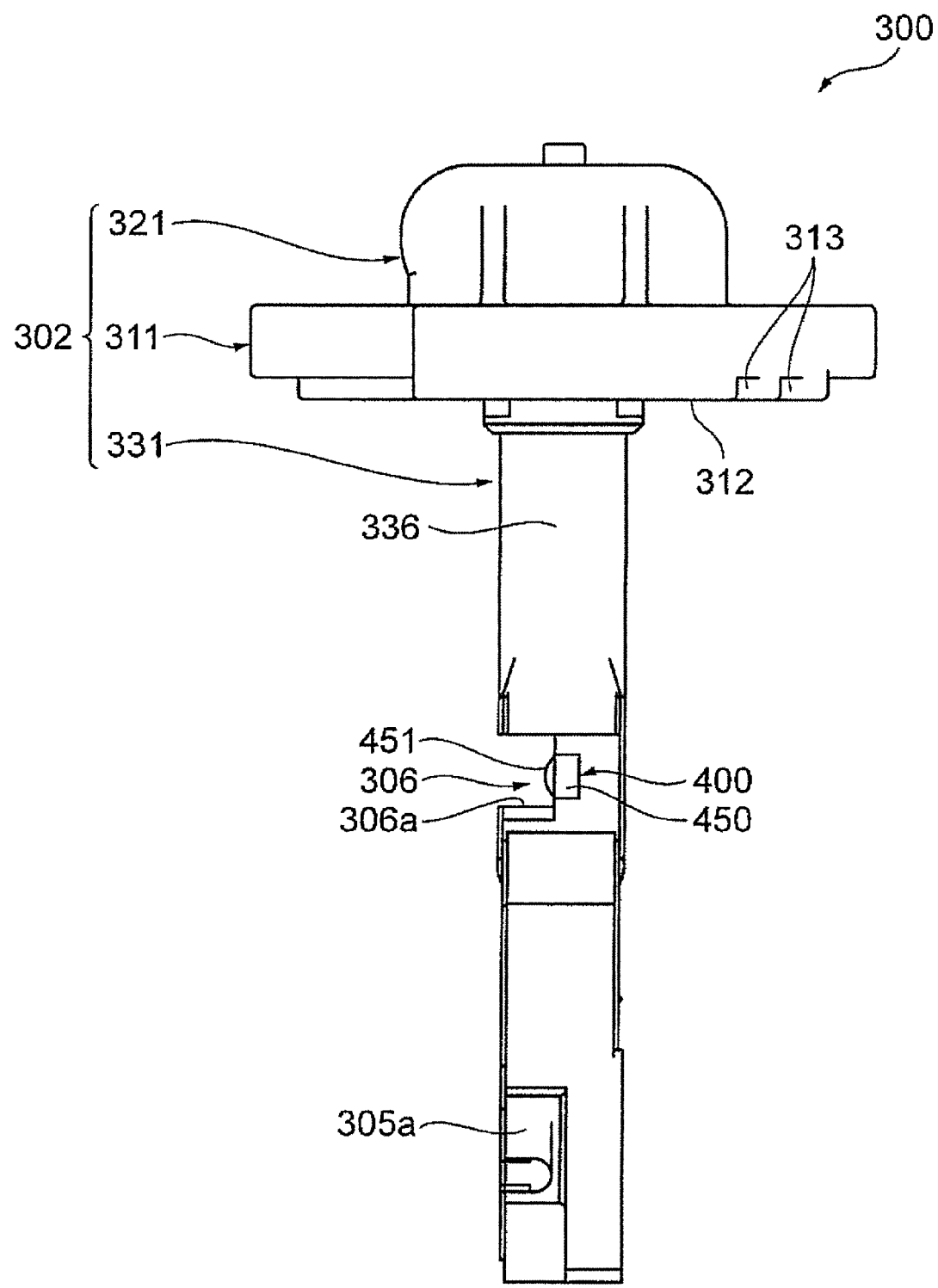
Figures 3, 4:
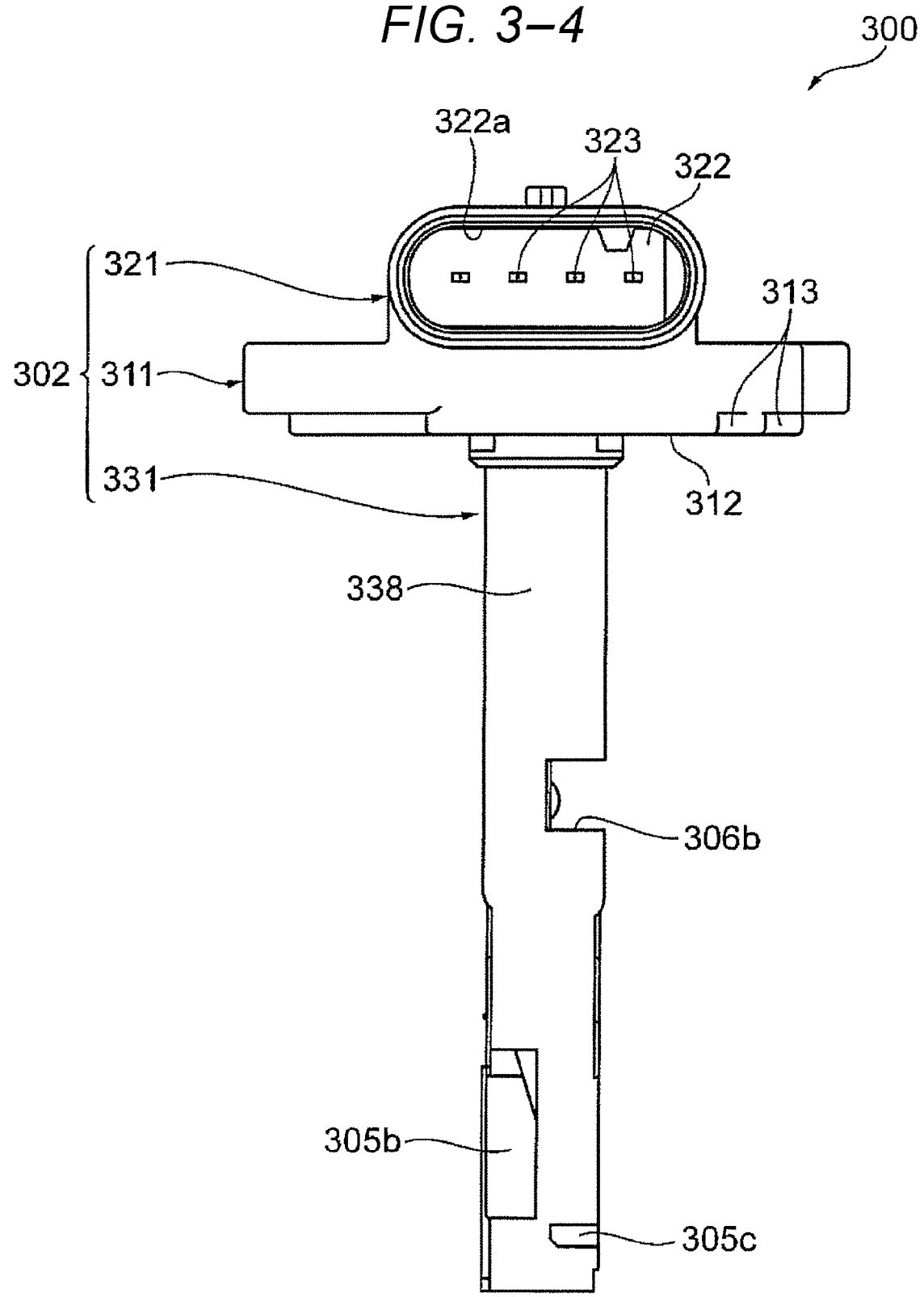
Figures 3, 4, 5:
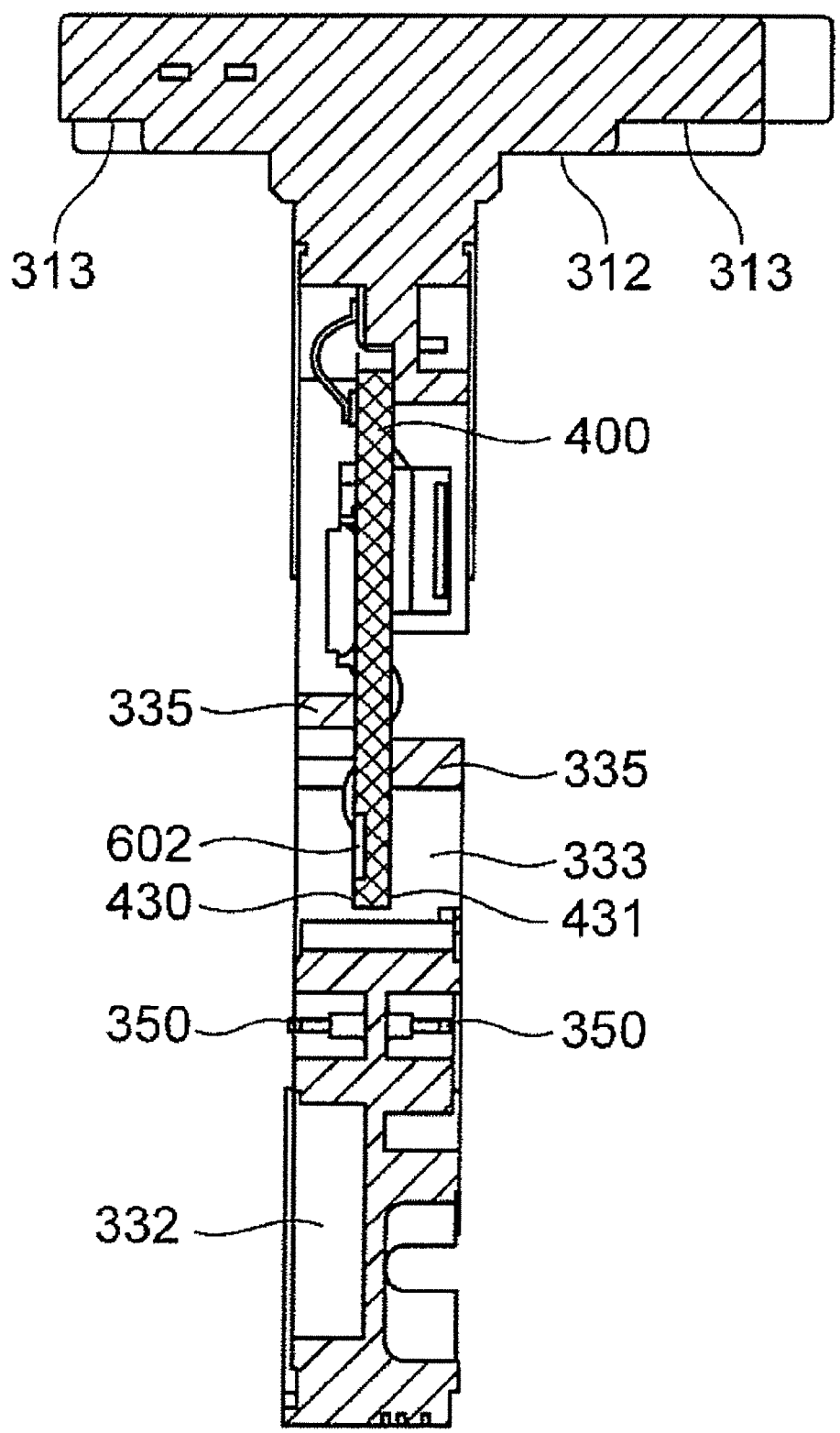
Figures 1, 4:
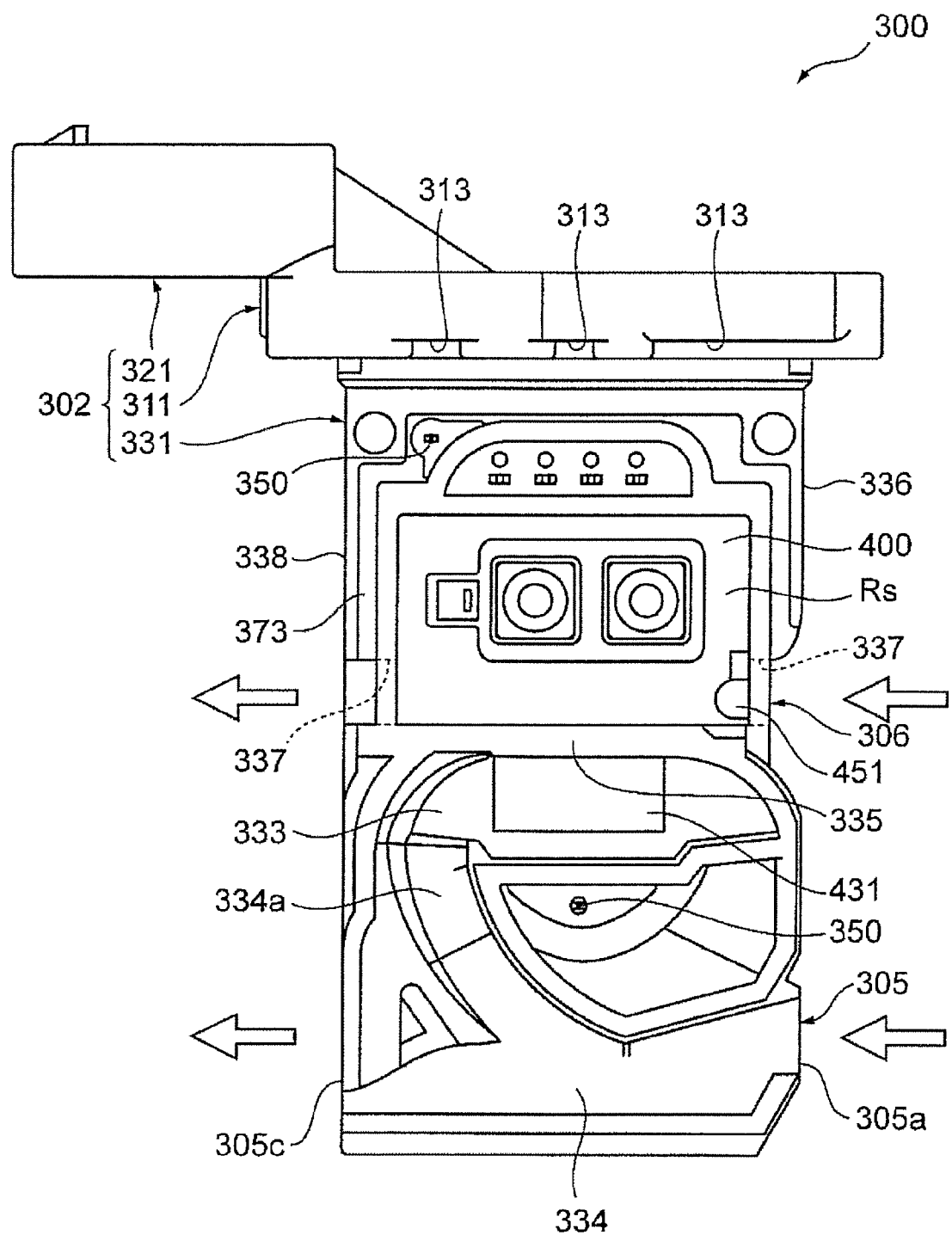
Figures 2, 4:
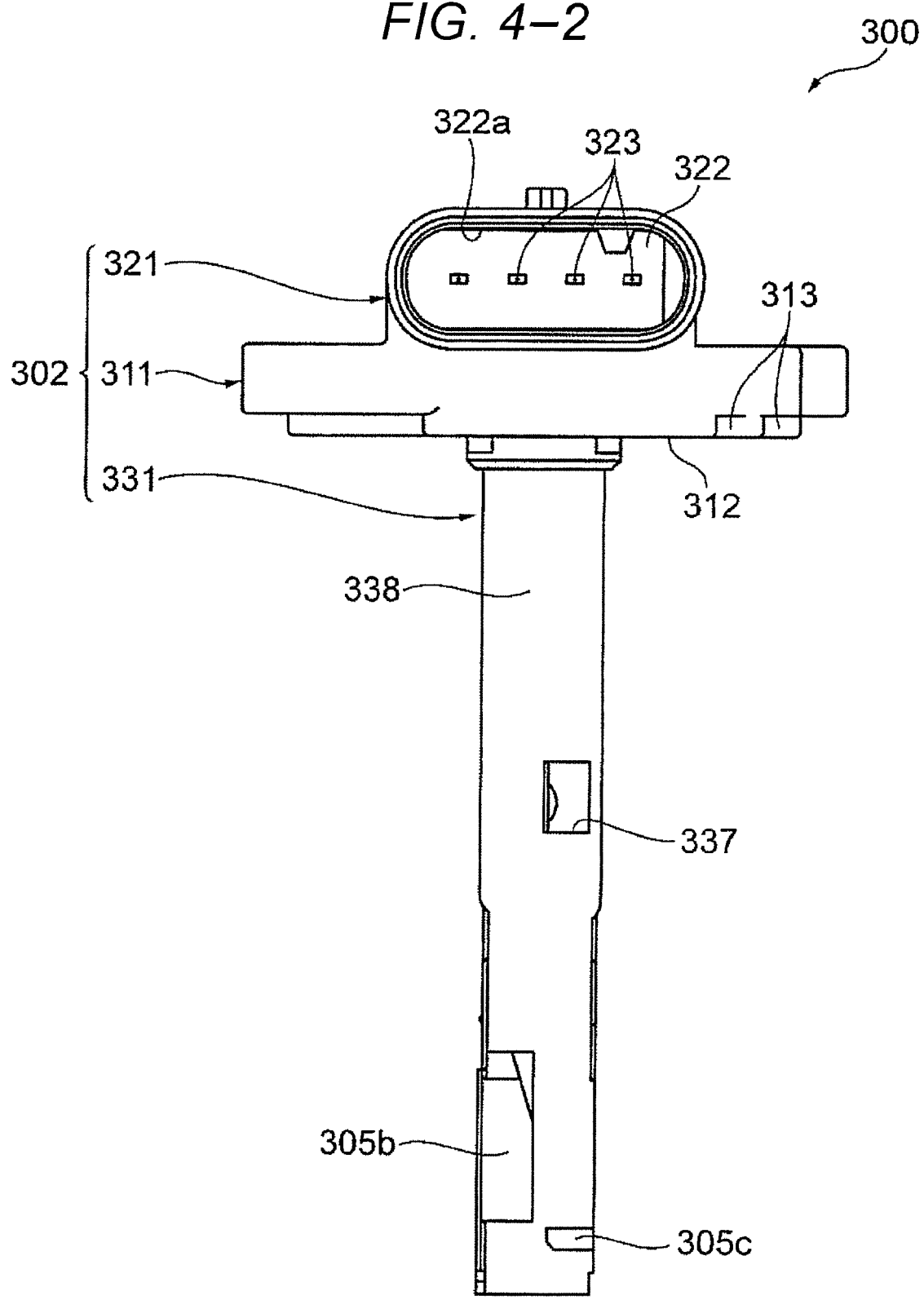
Figure 5:
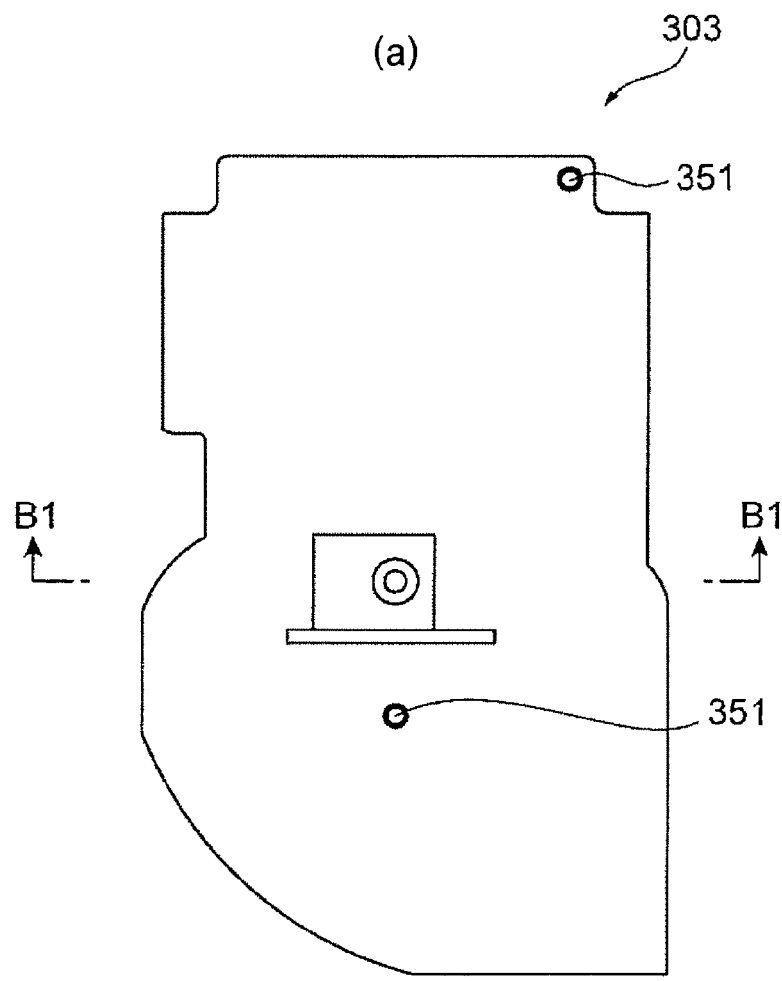
Figure 5:
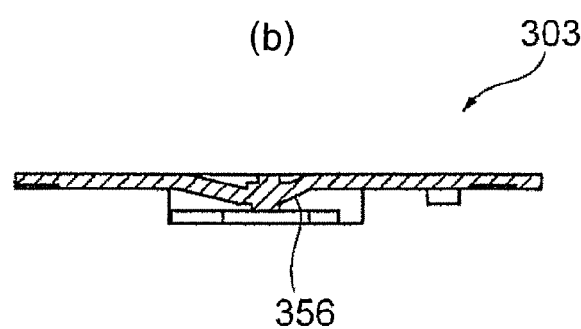
Figure 6:
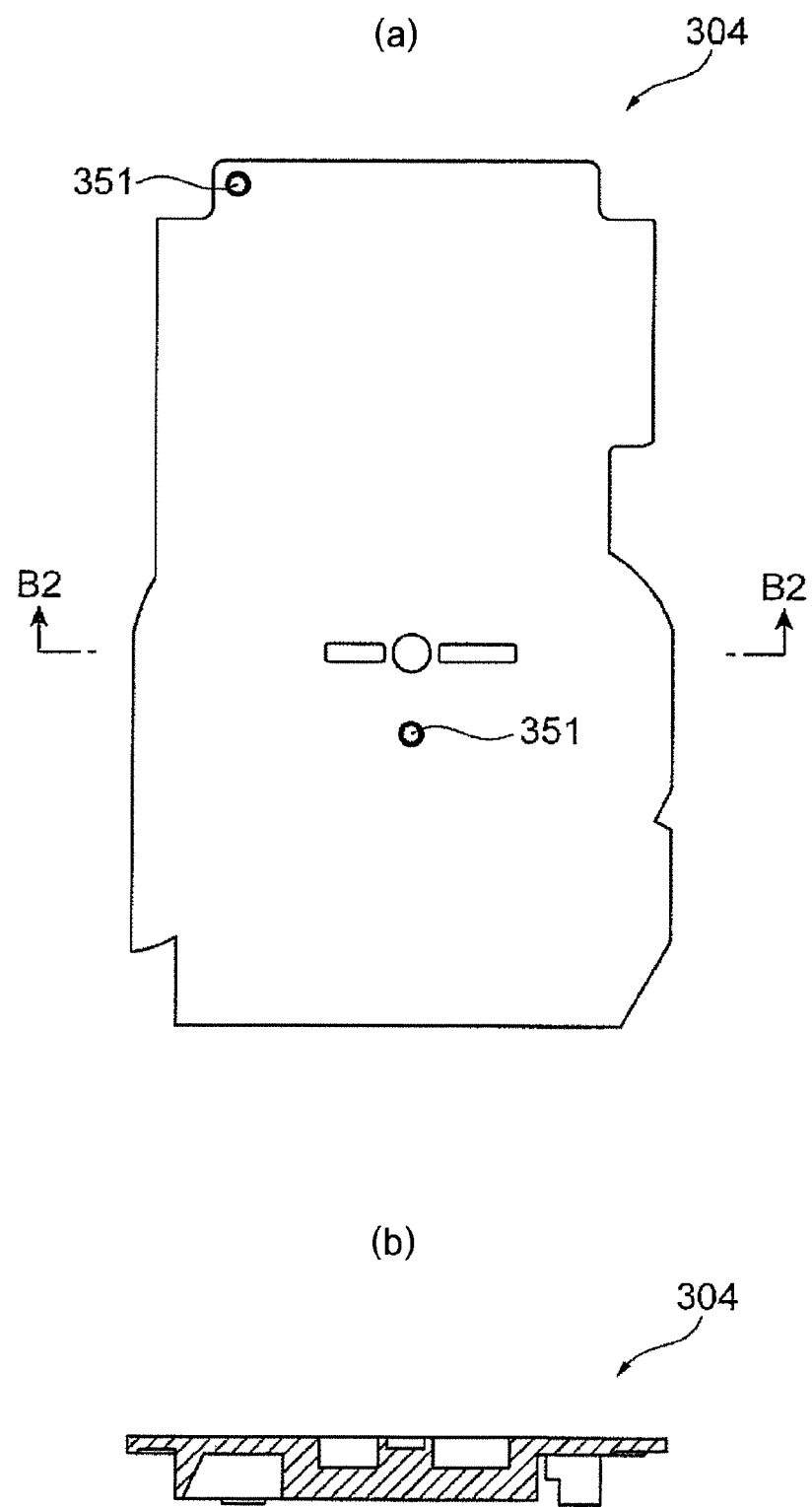

FIG. 5 is a view illustrating an external appearance of the front cover 303. FIG. 5(a) is an elevation view. FIG. 5(b) is a sectional view on line B1-B1 illustrated in FIG. 5(a). FIG. 6 is a view illustrating an external appearance of the rear cover 304. FIG. 6(a) is an elevation view. FIG. 6(b) is a sectional view on line B2-B2 illustrated in FIG. 6(a).

In FIGS. 5 and 6, the front cover 303 and the rear cover 304 cover the groove of a bypass passage at a front side 332 and the groove of a bypass passage at a back side 334 of the housing 302, and consequently the first bypass passage 305 is formed. Further, the front cover 303 forms a sealed circuit room Rc, and the rear cover 304 forms the second bypass passage 306 by filling a recessed portion on a back surface side of the measuring unit 331 and forms the sensor room Rs communicating with the second bypass passage 306.

The front cover 303 includes a projected portion 356 at a position opposing the detection unit of air flow 602, and the projected portion 356 is used to make a throttle between the front surface of main air flow 430 and the front cover 303. Therefore, molding accuracy is preferably high. The front cover 303 and the rear cover 304 are made in resin molding processing for injecting thermoplastic resin in a molding tool and therefore made in high molding accuracy.

A plurality of fixing holes 351 are disposed in which a plurality of fixing pins 350 are projected from the measuring unit 331, on the front cover 303 and the rear cover 304. The front cover 303 and the rear cover 304 are mounted on each of a front surface and a back surface of the measuring unit 331 and positioned by inserting the fixing pin 350 in the fixing hole 351 in the case. The front cover 303 and the rear cover 304 are bonded by such as laser welding along edges of the groove of a bypass passage at a front side 332 and the groove of a bypass passage at a back side 334 and also bonded by laser welding along edges of the circuit room Rc and the sensor room Rs.

3.5 Fixing Structure and Effects by Housing 302 of Circuit Board 400

Next, fixing by resin molding processing with respect to the housing 302 of the circuit board 400 will be described. In a predetermined place of a bypass passage groove forming a bypass passage, for example, in the embodiment, the circuit board 400 is integrally molded together with the housing 302 such that the detection unit of air flow 602 of the circuit board 400 is disposed in the aperture 333 which is a connecting portion between the groove of a bypass passage at a front side 332 and the groove of a bypass passage at a back side 334.

In the measuring unit 331 of the housing 302, a portion for fixing an outer peripheral edge of a base portion 402 of the circuit board 400 to the housing 302 by burying by resin molding is provided as fixing units 372 and 373. The fixing portions 372 and 373 are fixed by sandwiching the outer periphery edge of the base portion 402 of the circuit board 400 from a front side and a back side.

The housing 302 is manufactured in resin molding processing. In the resin molding processing, the circuit board 400 is incorporated in a resin of the housing 302 and fixed in the housing 302 by resin molding. In this manner, a positional relationship and a directional relationship which are a relationship with a shape of a bypass passage for which the detection unit of air flow 602 measures a flow rate by transferring heat between the gas being measured 30, for example, the groove of a bypass passage at a front side 332 and the groove of a bypass passage at a back side 334, can be maintained at extremely high accuracy. Consequently, a difference and a variability caused by each circuit board 400 can be reduced significantly. As a result, measuring accuracy of the circuit board 400 can be significantly improved. For example, in comparison with a method by using a conventional adhesive, the measuring accuracy can be dramatically improved.

The physical-quantity detection devices 300 are often manufactured by mass-production, and improvement of the measuring accuracy is limited in a method for bonding by an adhesive while strictly measuring. However, as in the embodiment, by fixing the circuit board 400 at the same time with molding a bypass passage in resin molding processing to mold a bypass passage which flows the gas being measured 30, variability of the measuring accuracy can be drastically reduced, and the measuring accuracy of each physical-quantity detection device 300 can be significantly improved.

For example, in the case where it is further described in the embodiments illustrated in FIGS. 3-1 to 3-5, the circuit board 400 can be fixed to the housing 302 at high accuracy such that a relationship between the groove of a bypass passage at a front side 332 and the groove of a bypass passage at a back side 334 and the detection unit of air flow 602 follows a prescribed relationship. In the physical-quantity detection device 300 manufactured in this manner, each of a positional relationship and a shape relationship between the detection unit of air flow 602 of the circuit board 400 and the first bypass passage 305 can be stationary obtained at high accuracy.

In the first bypass passage 305 in which the detection unit of air flow 602 of the circuit board 400 is stationarily disposed, for example, the groove of a bypass passage at a front side 332 and the groove of a bypass passage at a back side 334 can be molded at very high accuracy. Therefore, a work for molding the first bypass passage 305 from the grooves of bypass passages 332 and 334 is a work for covering both surfaces of the housing 302 by the front cover 303 and the rear cover 304. This work is a very simple and a work process having less factors which reduce measuring accuracy. The front cover 303 and the rear cover 304 are manufactured in resin molding processing with high molding accuracy. Therefore, a bypass passage provided in a prescribed relationship with the detection unit of air flow 602 of the circuit board 400 can be highly accurately completed. According to such a method, in addition to the improvement of measuring accuracy, high productivity can be obtained.

On the other hand, conventionally, a thermal flowmeter is manufactured by manufacturing a bypass passage and then bonding a measuring unit to the bypass passage by an adhesive. In such the method using an adhesive, variability of a thickness of the adhesive is increased, and a bonding position and a bonding angle change in each product. Therefore, improving measuring accuracy is limited. In addition, in the case where these works are performed in a mass-production process, it becomes very difficult to improve the measuring accuracy.

In the embodiment according to the present invention, the circuit board 400 is fixed by resin molding, and a bypass passage groove for molding the first bypass passage 305 by resin molding is molded at the same time. As a result, the detection unit of air flow 602 can be fixed at extremely high accuracy to a shape of a bypass passage groove and the bypass passage groove.

A portion related to measurement of a flow rate, for example, the detection unit of air flow 602 and the front surface of main air flow 430 in which the detection unit of air flow 602 is mounted are disposed on a front surface of the circuit board 400. The detection unit of air flow 602 and the front surface of main air flow 430 are exposed from resin for molding the housing 302. Specifically, the detection unit of air flow 602 and the front surface of main air flow 430 are not covered by the resin for molding the housing 302. The detection unit of air flow 602 and the front surface of main air flow 430 of the circuit board 400 are used after resin molding of the housing 302 and used for measuring air flow of the physical-quantity detection device 300. As a result, measuring accuracy is improved.

In the embodiment according to the present invention, the circuit board 400 is fixed to the housing 302 including the first bypass passage 305 by integrally molding the circuit board 400 together with the housing 302, and therefore the circuit board 400 can be certainly fixed to the housing 302. Especially, an exposed portion 403 of the circuit board 400 penetrates the dividing wall 335 and is exposed on the first bypass passage 305. Therefore, a high sealing property between the first bypass passage 305 and the circuit room Rc prevents that the gas being measured 30 leaks from the first bypass passage 305 into the circuit room Rc and prevents that circuit components and a wiring of the circuit board 400 corrode by coming into contact with the gas being measured 30.

3.6 Structure and Effect of Terminal Connecting Portion 320

Figures 1, 10:
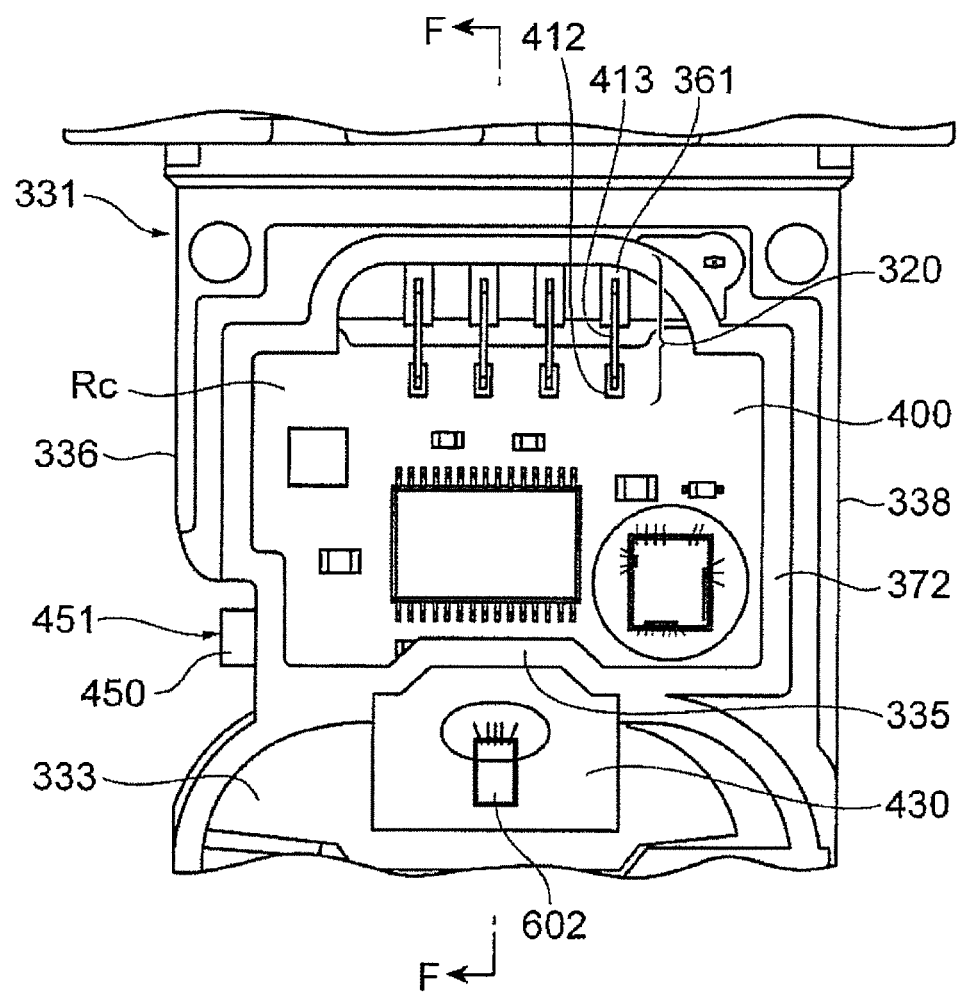
Figures 2, 10:
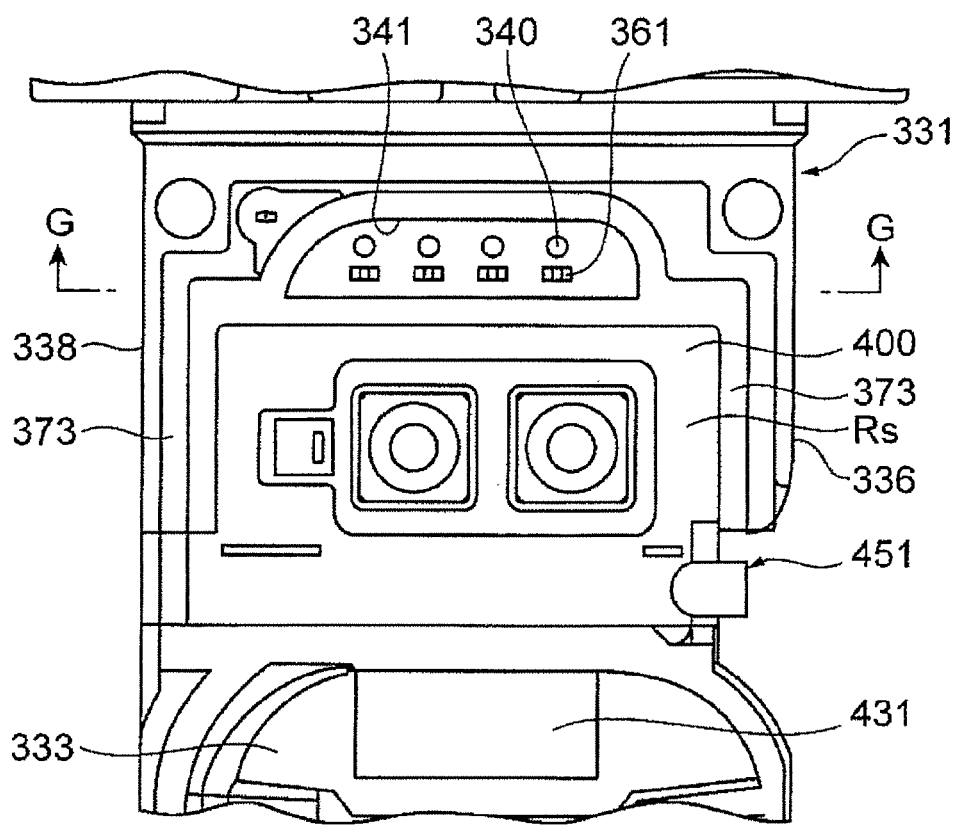
Figures 3, 10:
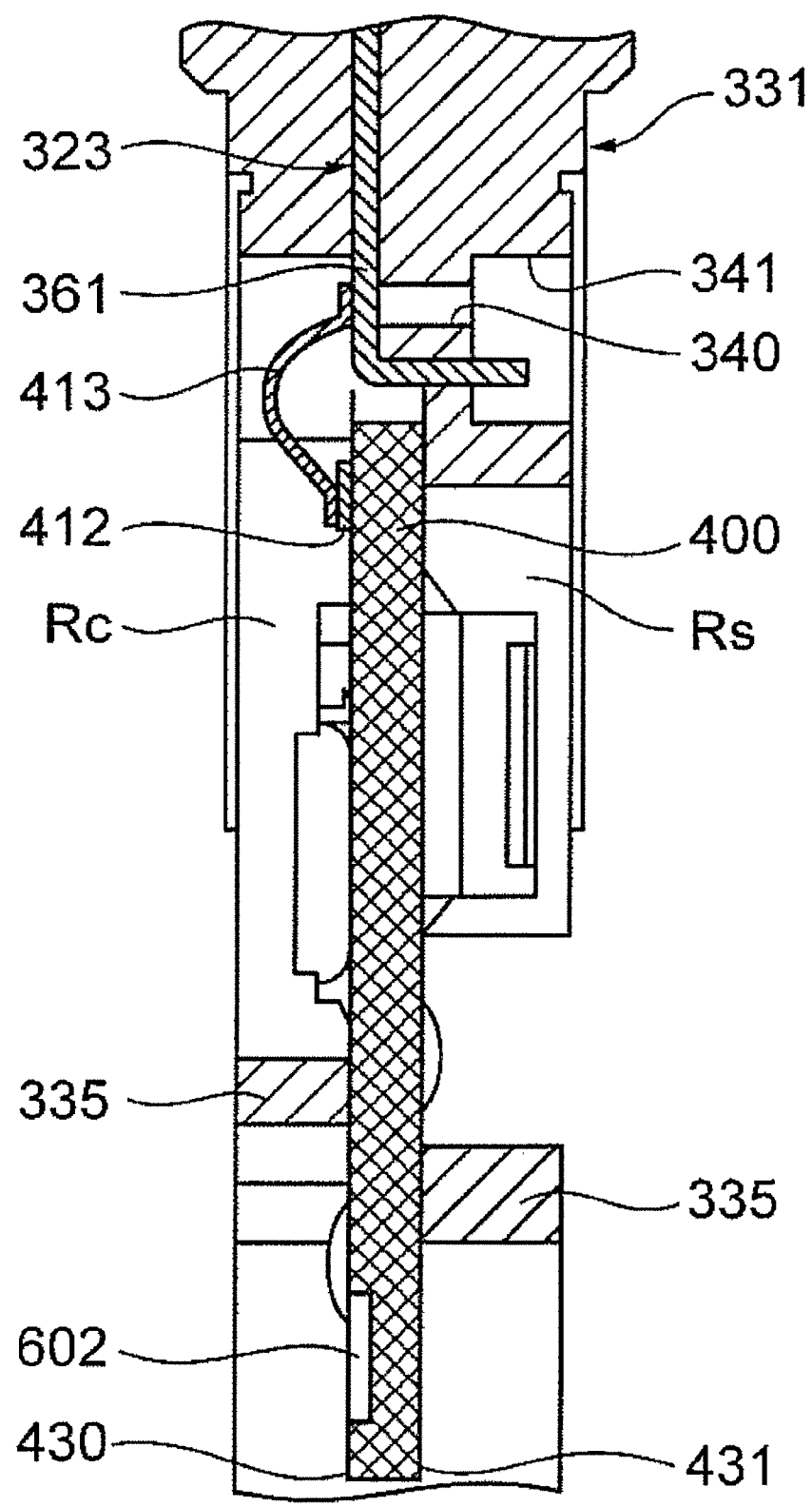
Figure 10:
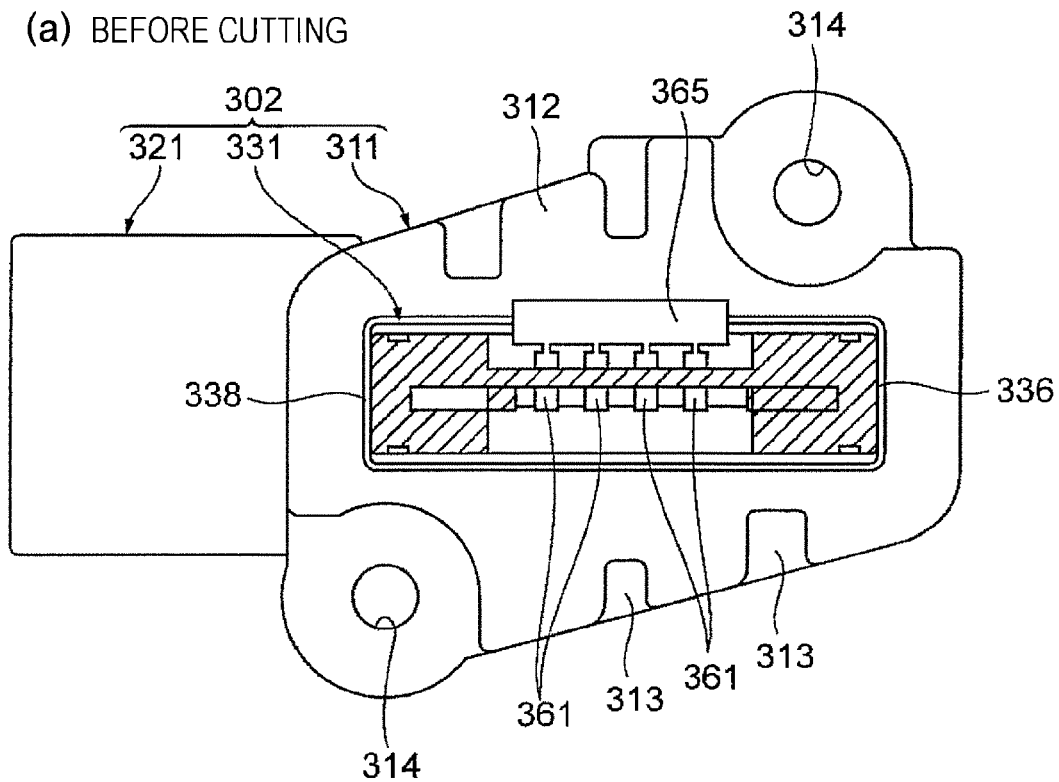
Figure 4:
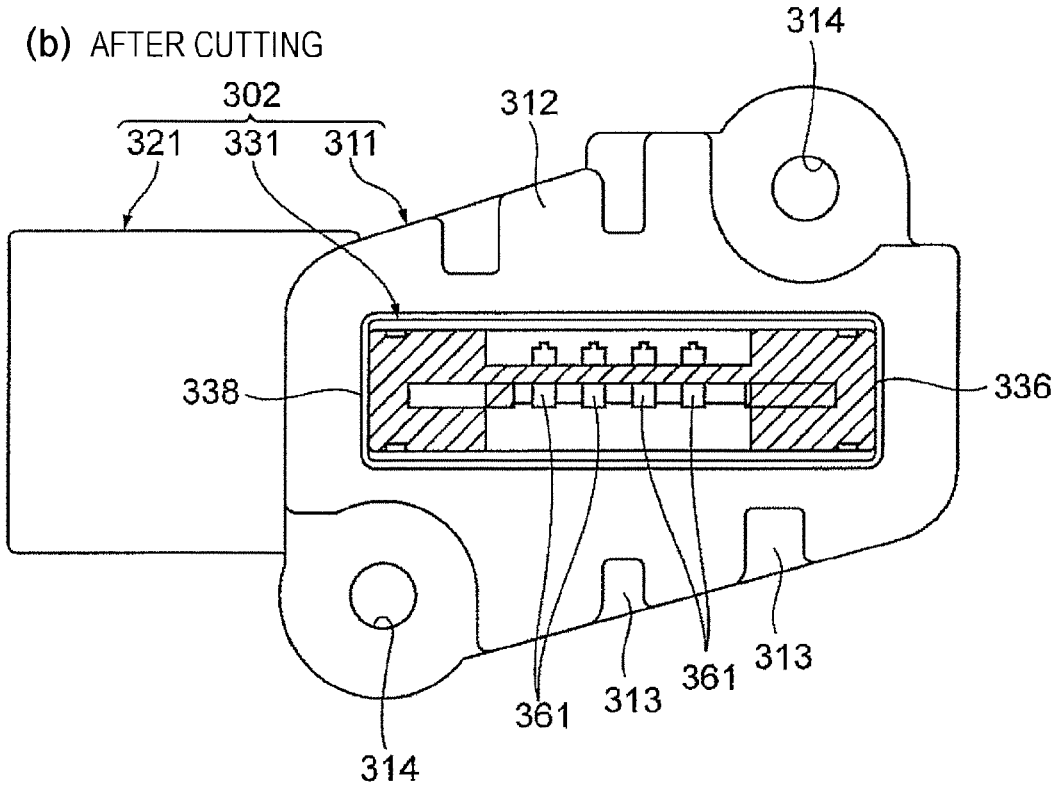

Next, a structure of a terminal connecting portion will be described with reference to FIGS. 10-1 to 10-4. FIG. 10-1 is a view describing a structure of the terminal connecting portion. FIG. 10-2 is a view describing a structure of the terminal connecting portion. FIG. 10-3 is a sectional view on line F-F illustrated in FIG. 10-1. FIG. 10-4 is a sectional view on line G-G illustrated in FIG. 10-2.

The terminal connecting portion 320 connects between an inner end 361 of the external terminal 323 and a connecting terminal 412 of the circuit board 400 by using an aluminum wire or a gold wire 413. As illustrated in FIG. 10-1, the inner end 361 of each of external terminals 323 is projected in the circuit room Rc from the flange 311 side and disposed in line with a predetermined space in accordance with a position of the connecting terminal 412 of the circuit board 400.

The inner end 361 is disposed at a position almost flush with a front surface of the circuit board 400 as illustrated in FIG. 10-3. Then, a tip of the inner end 361 is bent in a substantial L-shape from a front surface to a back surface side of the measuring unit 331 and exposed on a back surface of the measuring unit 331. Tips of inner ends 361 are connected by a joint portion 365 as illustrated in FIG.

10-4(*a*) and individually separated by separating the joint portion 365 after molding as illustrated in FIG. 10-4(*b*).

Each of the inner ends 361 is fixed to the housing 302 by resin molding in molding processing such that the inner end 361 and the circuit board 400 are disposed on a same flat surface. Each inner end 361 is fixed to the housing 302 by the resin molding processing in a state in which the inner ends are integrated each other by the joint portion 365 to prevent deformation and displacement. After being fixed to the housing 302, the joint portion 365 is separated.

The inner end 361 is resin-molded in a state of being sandwiched from a front surface side and a back surface side of the measuring unit 331. In such a case, a molding tool abuts on the entire front surface of the inner end 361, and a fixing pin abuts on a back surface of the inner end 361. Therefore, a surface of the inner end 361 on which an aluminum wire or a gold wire is welded can be completely exposed without being covered by a molded resin by resin leakage, and wire welding can be easily performed. A pin hole 340 which is a trace of pressing the inner end 361 by the fixing pin is formed in the measuring unit 331.

A tip of the inner end 361 is projected in a recessed portion 341 formed on a back surface of the measuring unit 331. The recessed portion 341 is covered by the rear cover 304, the circumference of the recessed portion 341 is continuously bonded to the rear cover 304 by such as laser welding, and a sealed room space is formed. Therefore, corrosion of the inner end 361 by coming into contact with the gas being measured 30 is prevented.

4. External Appearance of Circuit Board 400

4.1 Molding of Front Surface of Main Air Flow 430 Including Detection Unit of Air Flow 602

Figures 1, 7:
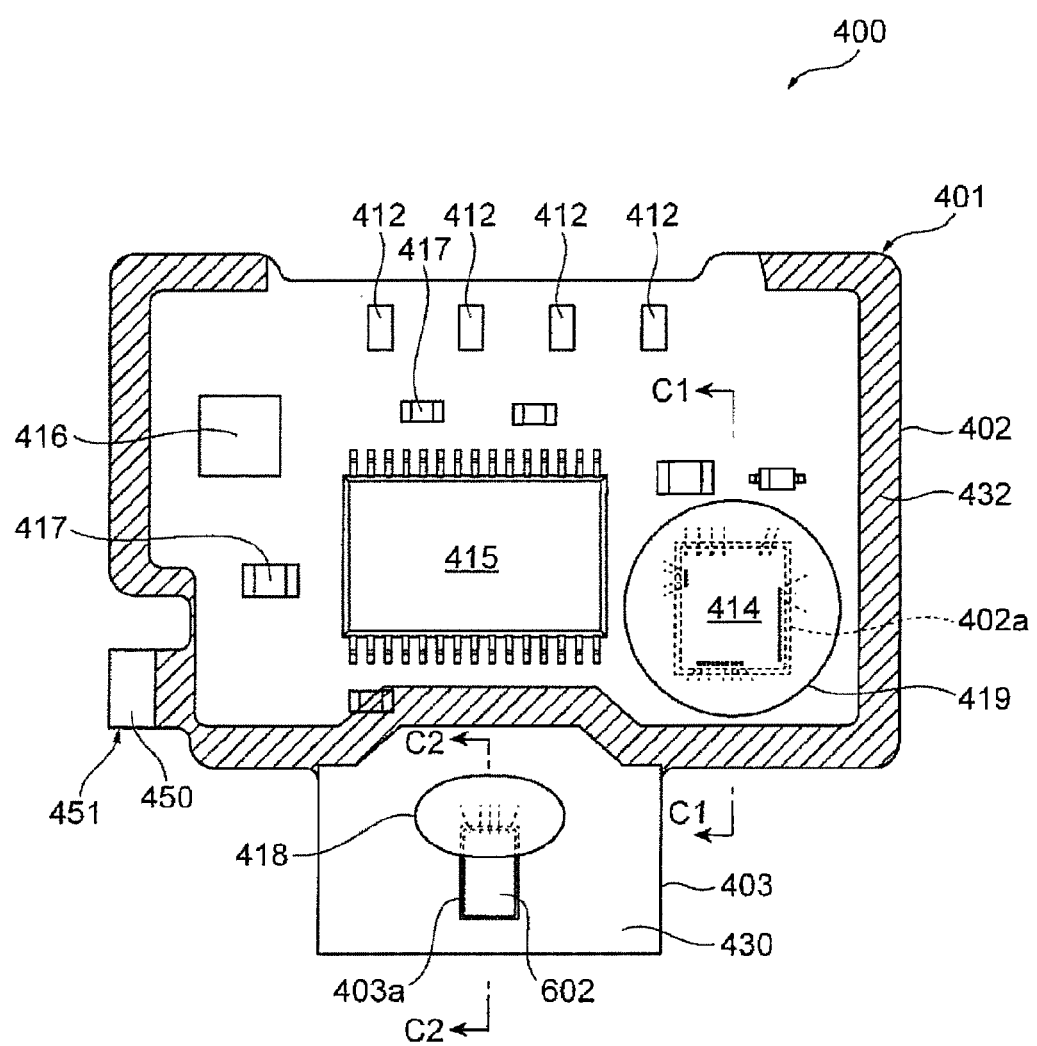
Figures 2, 7:
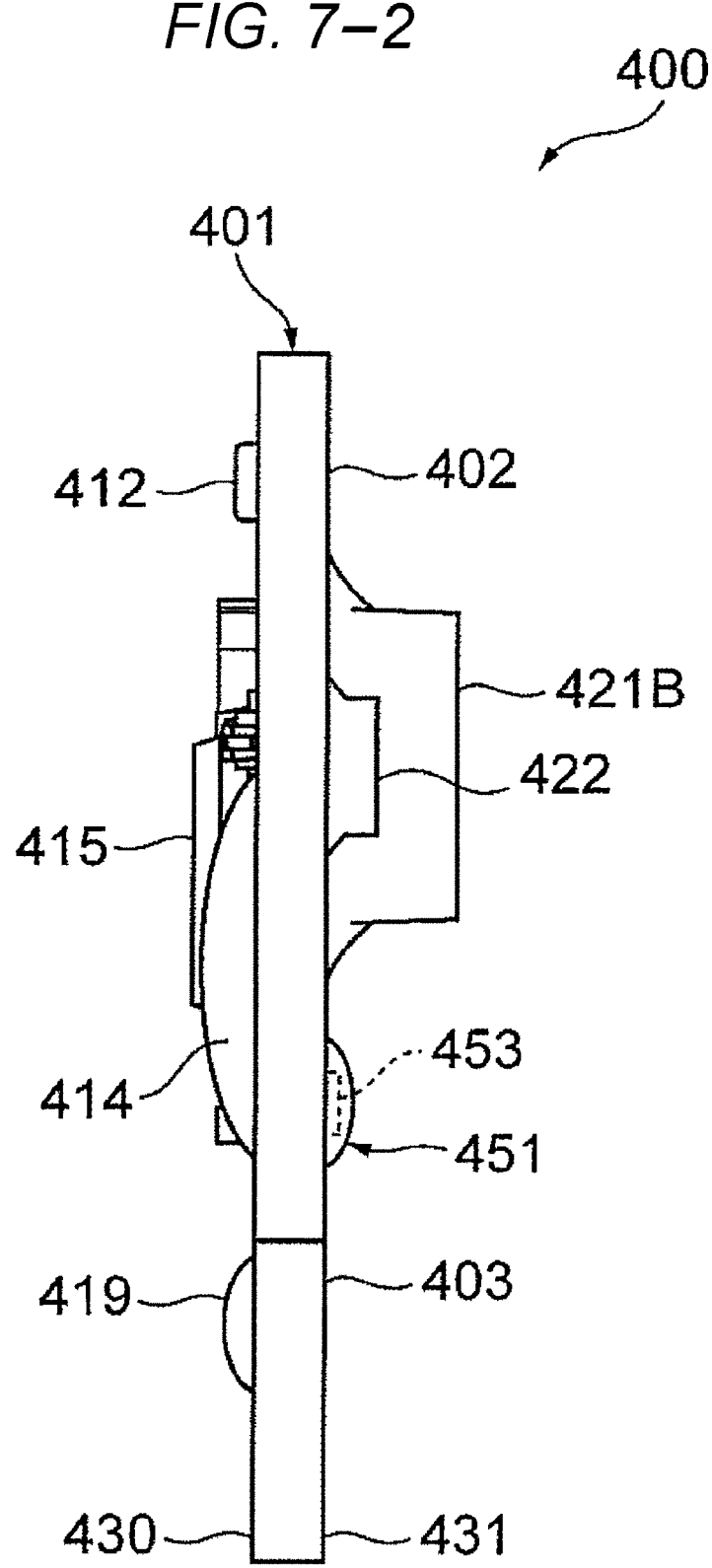
Figures 3, 7:
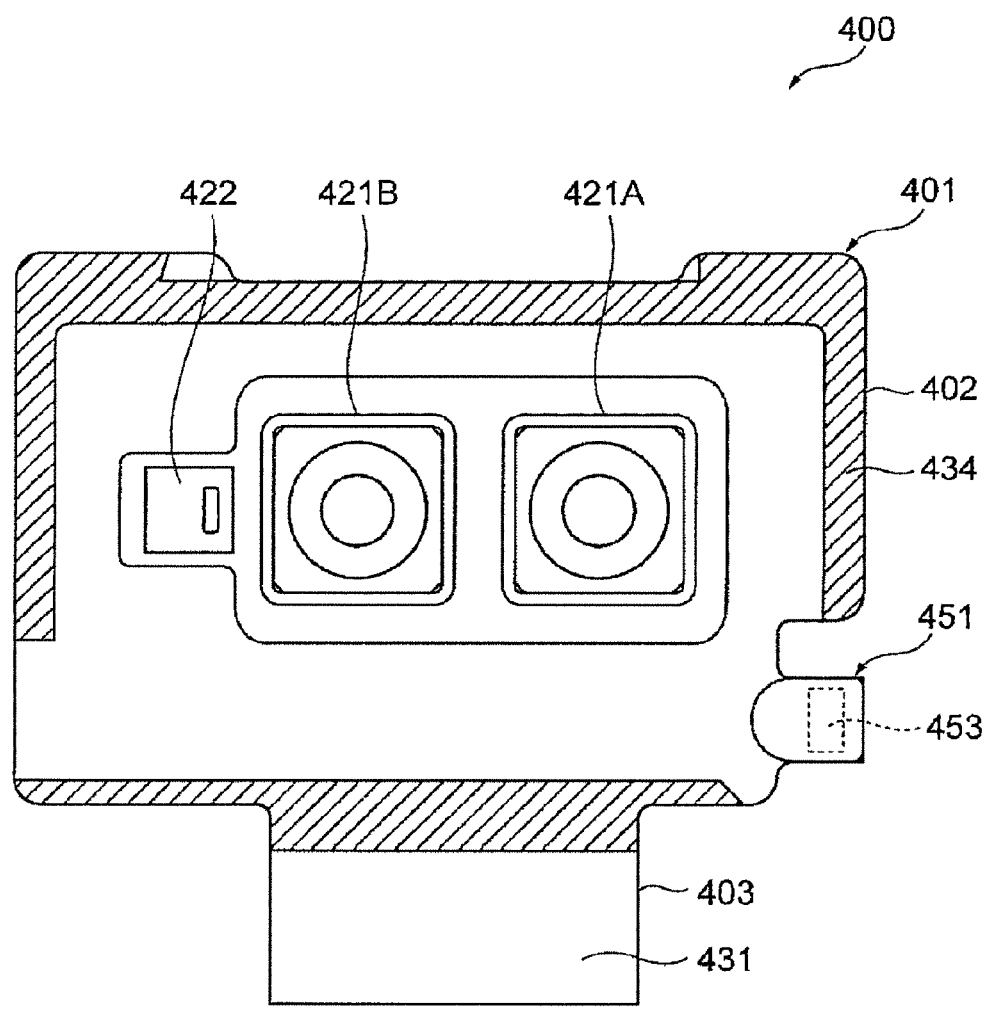
Figures 4, 7:
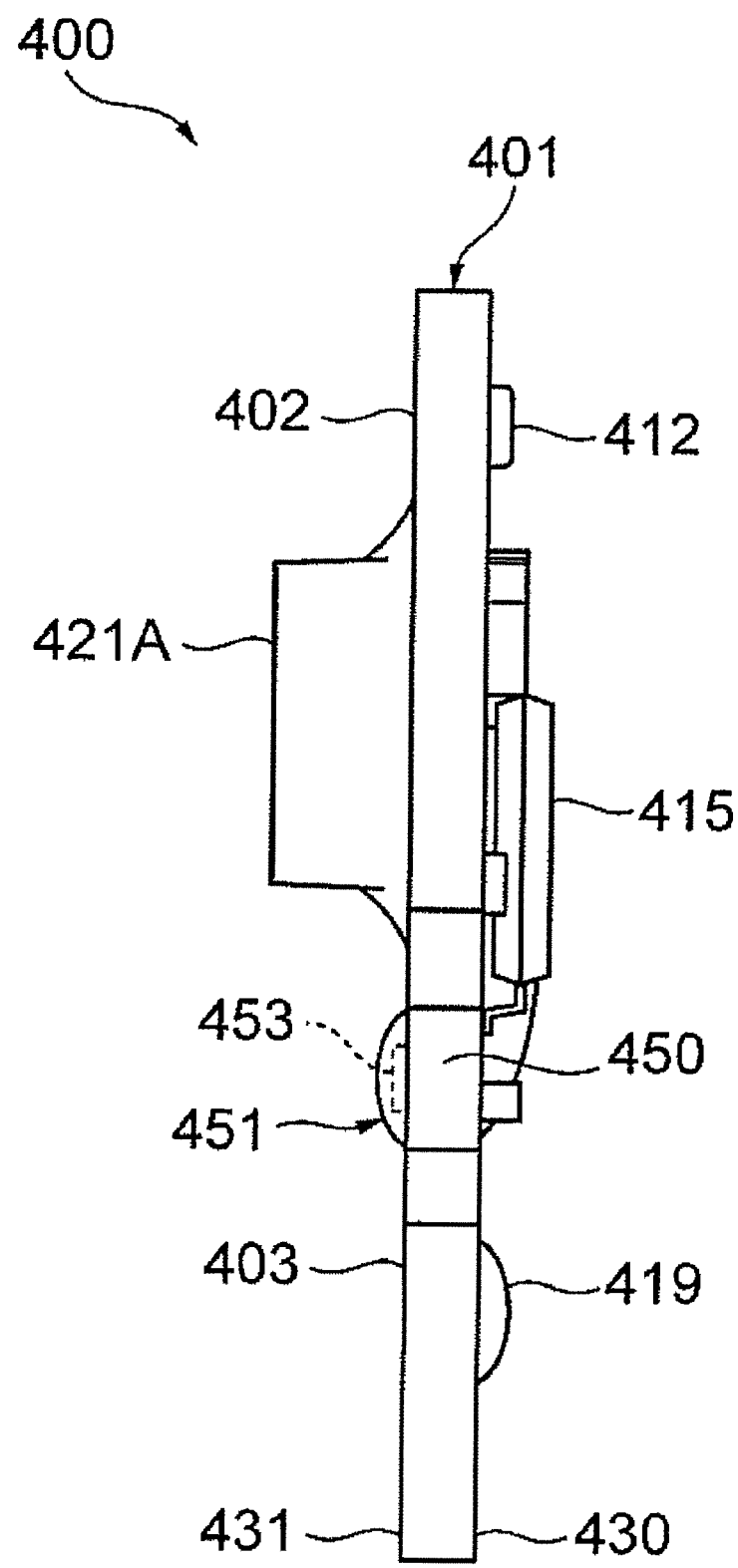
Figures 5, 7:
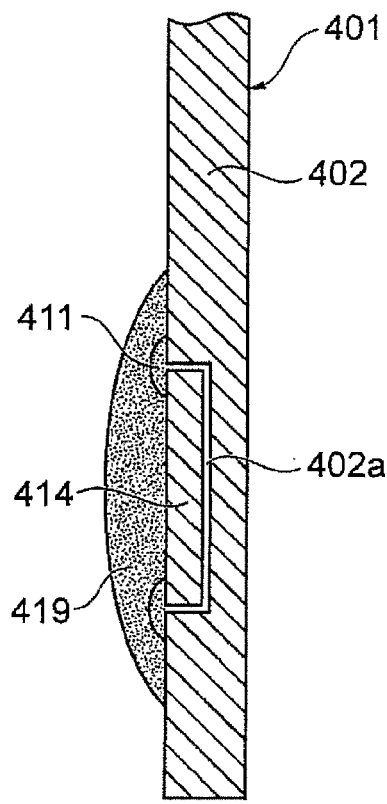
Figures 6, 7:
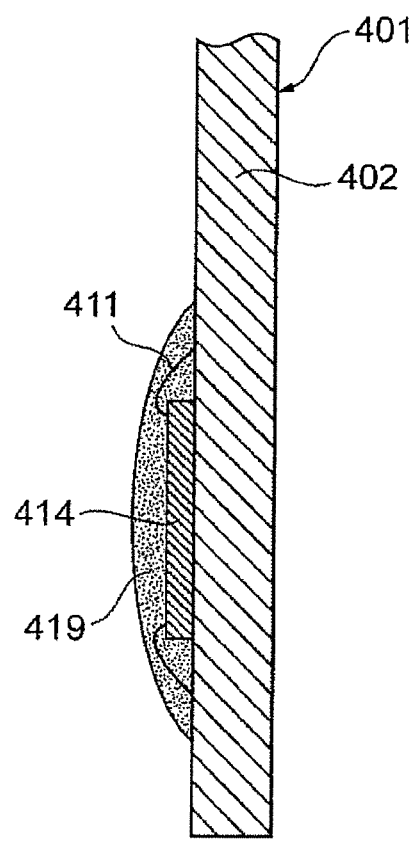
Figure 7:
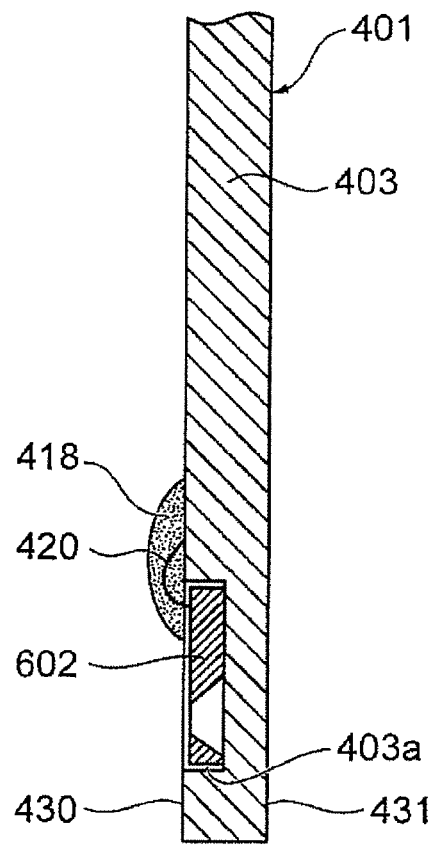

FIGS. 7-1 to 7-6 illustrate an external appearance of the circuit board 400. A hatched portion illustrated on the external appearance of the circuit board 400 indicates fixing surfaces 432 and 434 fixed by covering the circuit board 400 by resin when the housing 302 is molded in resin molding processing.

FIG. 7-1 is an elevation view of the circuit board. FIG. 7-2 is a right side view of the circuit board. FIG. 7-3 is a back view of the circuit board. FIG. 7-4 is a left side view of the circuit board. FIG. 7-5 is a sectional view on line C1-C1 illustrating a sectional surface of an LSI portion in FIG. 7-1. FIG. 7-6 indicates a view illustrating another embodiment corresponding to the sectional surface on line C1-C1 illustrated in FIG. 7-1.

The circuit board 400 includes a board body 401. A circuit unit and the detection unit of air flow 602 which is a sensing element are disposed on a surface of the board body 401. The pressure sensor 421 and the humidity sensor 422 which are sensing elements are disposed on a back surface of the board body 401. The board body 401 is formed by materials made of glass epoxy resin, and in comparison with a board made of ceramic materials, and the board body 401 includes a value approximate to a thermal expansion coefficient of a thermoplastic resin forming the housing 302. Therefore, when the board body 401 is insert-molded into the housing 302, a stress by a difference in a thermal expansion coefficient can be reduced, a distortion of the circuit board 400 can be reduced.

The board body 401 has a flat plate shape having a specified thickness. The board body 401 has a substantial T-shape in plan view including the substantially rectangular-shaped base portion 402 and the substantially rectangular exposed portion 403 which is one size smaller than the base portion 402 projected from one side of the base portion 402. A circuit unit is provided on a surface of the base portion 402. The circuit unit includes, on a circuit wire (not illustrated), electronic components including an LSI 414, a microprocessor 415, a power source regulator 416, and a chip parts 417 such as a resistor and a capacitor. The power source regulator 416 generates lots of heat in comparison with other electronic components such as the microprocessor 415 and the LSI 414 and is disposed on a relatively upstream side in the circuit room Rc. The LSI 414 is entirely sealed by a synthetic resin material 419 so as to include a gold wire 411, and a handleability of the circuit board 400 is improved during insert mold.

As illustrated in FIG. 7-5, a recessed portion 402*a* in which the LSI 414 is fitted is provided on a surface of the board body 401. The recessed portion 402*a* is formed by performing laser processing to the board body 401. The board body 401 made of a glass epoxy resin can be easily processed in comparison with a board body made of ceramic, and therefore the recessed portion 402*a* can be easily provided. The recessed portion 402*a* has a depth in which a surface of the LSI 414 is flush with a surface of the board body 401. Thus, by coinciding with heights of the surface of the LSI 414 and the surface of the board body 401, wire bonding in which the LSI 414 and the board body 401 are bonded by the gold wire 411 can be easily performed, and the circuit board 400 can be easily manufactured. The LSI 414 can be directly disposed on a surface of the board body 401 as illustrated in FIG. 7-6, for example. In the case of such a structure, the synthetic resin material 419 covering the LSI 414, processing to form the recessed portion 402*a* on the board body 401 becomes unnecessary, and manufacturing can be simplified.

When the circuit board 400 is insert-molded in the housing 302, the exposed portion 403 is disposed in the first bypass passage 305. The front surface of main air flow 430 which is a front surface of the exposed portion 403 extends along a flow direction of the gas being measured 30. The detection unit of air flow 602 is provided on the front surface of main air flow 430 of the exposed portion 403. The detection unit of air flow 602 transfers heat to and from the gas being measured 30, and the detection unit of air flow 602 measures a state of the gas being measured 30, for example, a flow speed of the gas being measured 30, and outputs an electric signal expressing a flow rate flowing in the main channel 124. To highly accurately measure a state of the gas being measured 30 by the detection unit of air flow 602, the gas flowing near the front surface of main air flow 430 is preferably a laminar flow and not disturbed. Therefore, preferably, a surface of the detection unit of air flow 602 and the front surface of main air flow 430 are flush with each other, or a difference therebetween is equal to or less than a predetermined value.

The recessed portion 403*a* is provided on the front surface of main air flow 430, and the detection unit of air flow 602 is fitted thereto. The recessed portion 403*a* is also formed by performing laser processing. The recessed portion 403*a* has a depth in which a surface of the detection unit of air flow 602 is flush with the front surface of main air flow 430. The detection unit of air flow 602 and a wire portion of the detection unit of air flow 602 are covered by a synthetic resin material 418, and consequently the occurrence of electric erosion by deposition of saline solution is prevented.

Two pressure sensors 421A and 421B and one humidity sensor 422 are disposed on a back surface of the board body 401. The two pressure sensors 421A and 421B are linearly disposed by dividing on an upstream side and a downstream side. The humidity sensor 422 is disposed on a downstream side of the pressure sensor 421B. The two pressure sensors 421A and 421B and the one humidity sensor 422 are disposed in the sensor room Rs. The case where the two pressure sensors 421A and 421B and the one humidity sensor 422 are included has been described in the example illustrated in FIG. 7-3. However, as illustrate in FIG. 8-2(a), only the pressure sensor 421B and the humidity sensor 422 may be included. In addition, as illustrated in FIG. 8-3(a), only the humidity sensor 422 may be included.

In the circuit board 400, a back surface of the board body 401 forms a part of a passage wall surface of the second bypass passage 306. Therefore, the board body 401 can be entirely cooled by the gas being measured 30 passing through the second bypass passage 306.

4.2 Structure of Detection Unit of Temperature 451

A detection unit of temperature 451 is disposed at an end on the upstream side of the base portion 402 and at a corner on the exposed portion 403 side. The detection unit of temperature 451 includes one detection unit to detect a physical quantity of the gas being measured 30 flowing in the main channel 124 and is disposed in the circuit board 400. The circuit board 400 includes the exposed portion 450 exposing toward an upstream side of the gas being measured 30 from the second bypass passage inlet 306a of the second bypass passage 306, and the detection unit of temperature 451 includes a tip-type temperature sensor 453 which is the exposed portion 450 and disposed on a back surface of the circuit board 400. The temperature sensor 453 and a wire portion of the temperature sensor 453 are covered by a synthetic resin material, and consequently the occurrence of electric erosion by deposition of saline solution is prevented.

As illustrated in FIG. 3-2, for example, the outer wall at upstream 336 in the measuring unit 331 including the housing 302 is recessed toward a downstream side at a center portion of the measuring unit 331 in which the second bypass passage inlet 306a is disposed, and the exposed portion 450 of the circuit board 400 is exposed toward an upstream side from the outer wall at upstream 336 having the dent shape. A tip of the exposed portion 450 is disposed at a position recessed in comparison with a surface on the uppermost stream side of the outer wall at upstream 336. The detection unit of temperature 451 is disposed in the exposed portion 450 so as to face on a back surface of the circuit board 400, in other words, on the second bypass passage 306 side.

The second bypass passage inlet 306a is formed on a downstream side of the detection unit of temperature 451. Therefore, the gas being measured 30 flowing from the second bypass passage inlet 306a into the second bypass passage 306 flows into the second bypass passage inlet 306a after coming into contact with the detection unit of temperature 451, and a temperature is detected when the gas being measured 30 comes into contact with the detection unit of temperature 451. The gas being measured 30 being contacted to the detection unit of temperature 451 flows into the second bypass passage 306 from the second bypass passage inlet 306a passes through the second bypass passage 306 and is discharged from the second bypass passage outlet 306b to the main channel 124.

4.3 Fixing of Circuit Board 400 and Effects Thereof in Resin Molding Processing

Figures 1, 9:
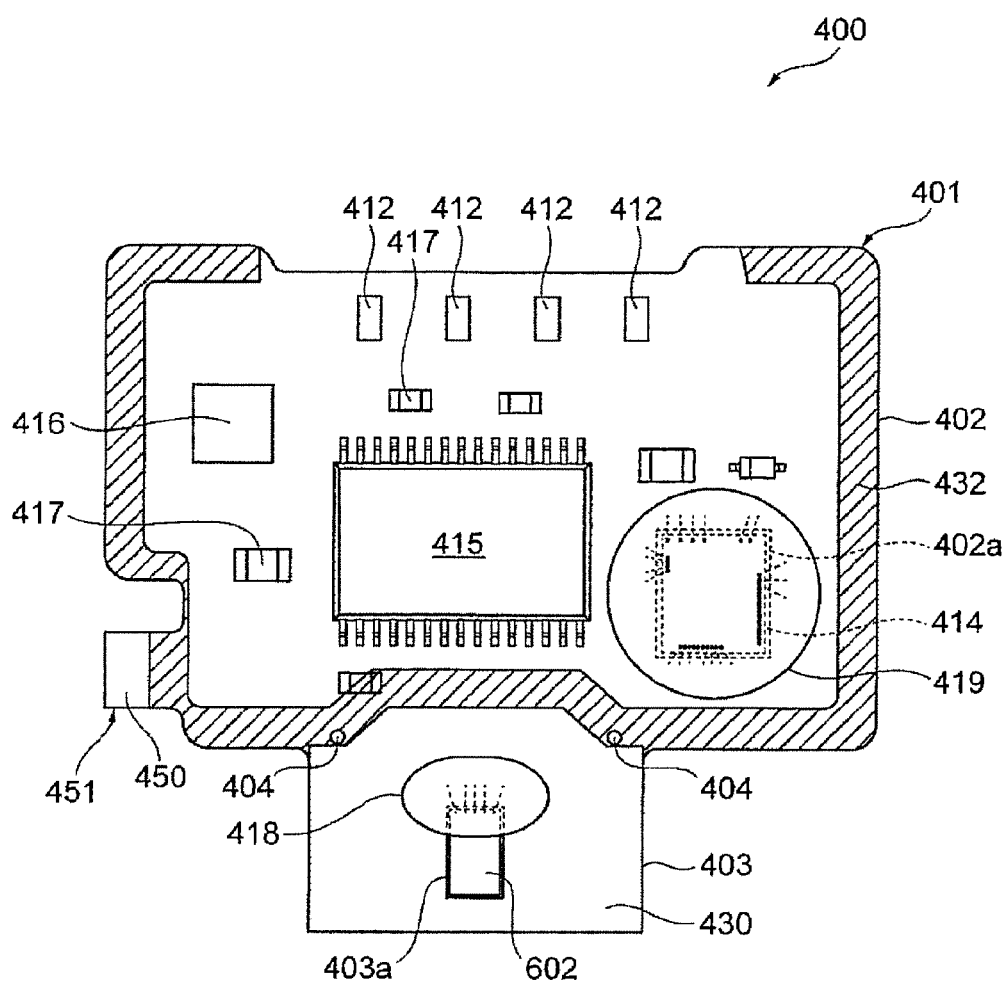
Figures 2, 9:
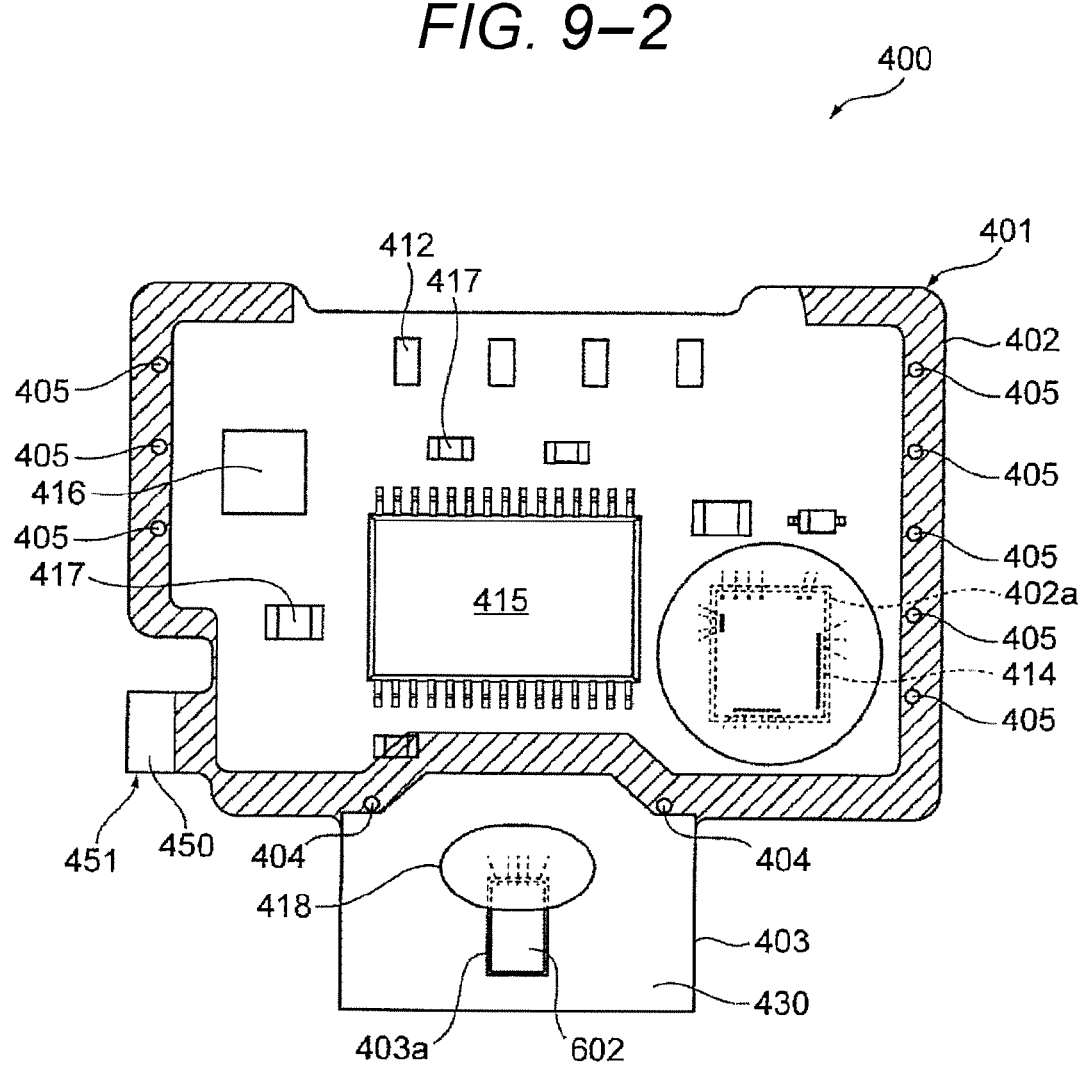
Figures 4, 9:
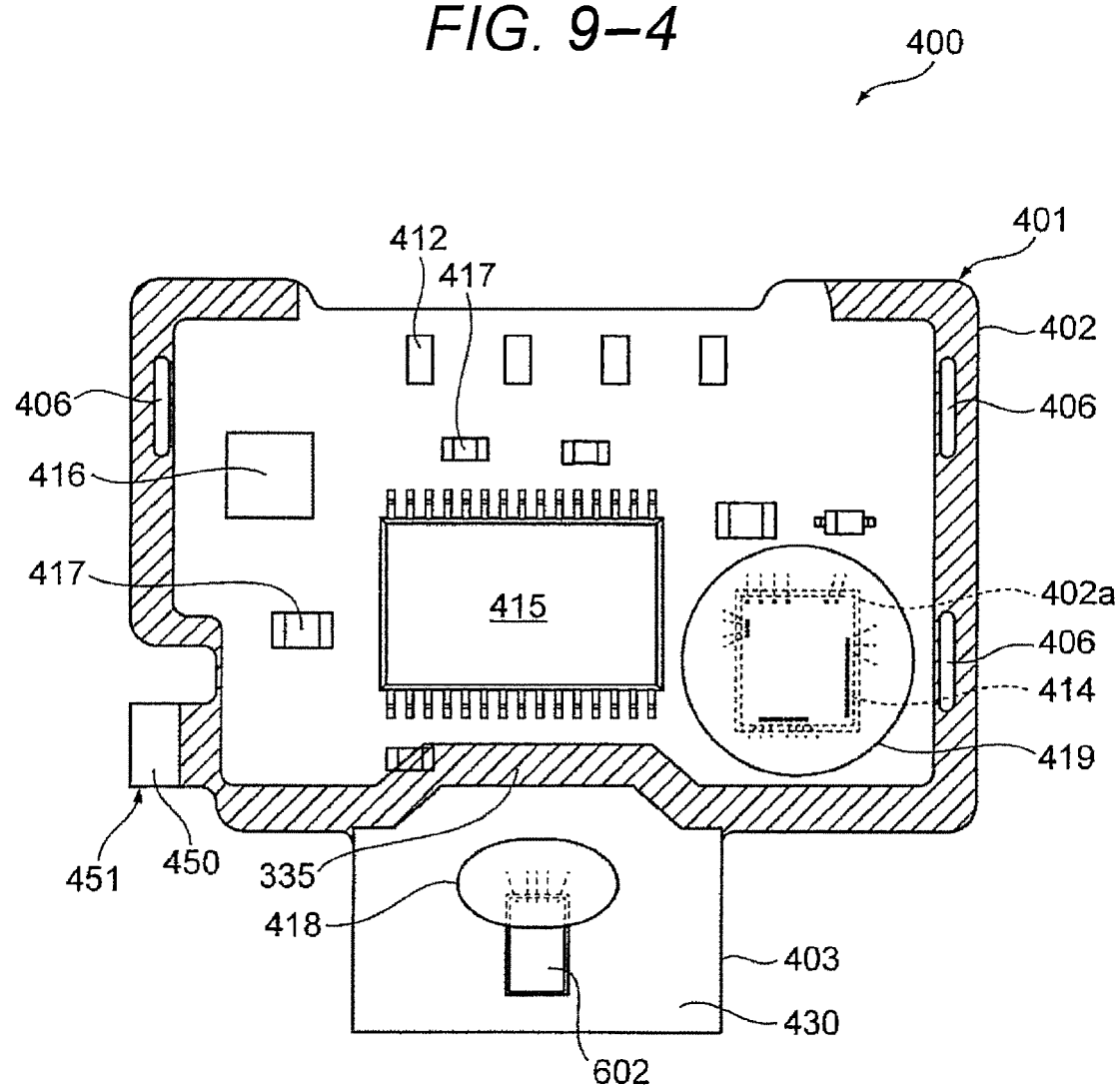
Figures 5, 9:
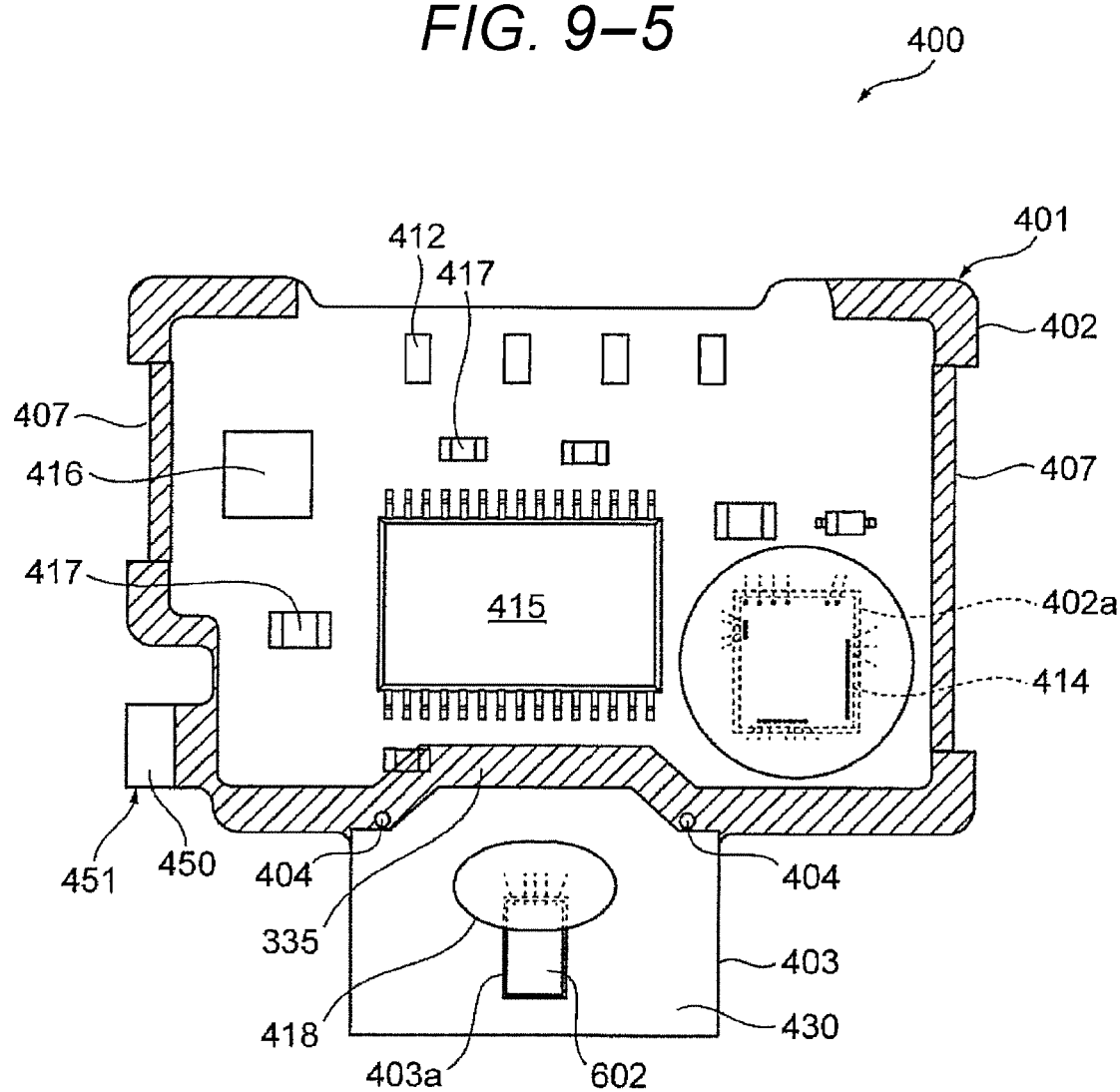
Figures 6, 9:
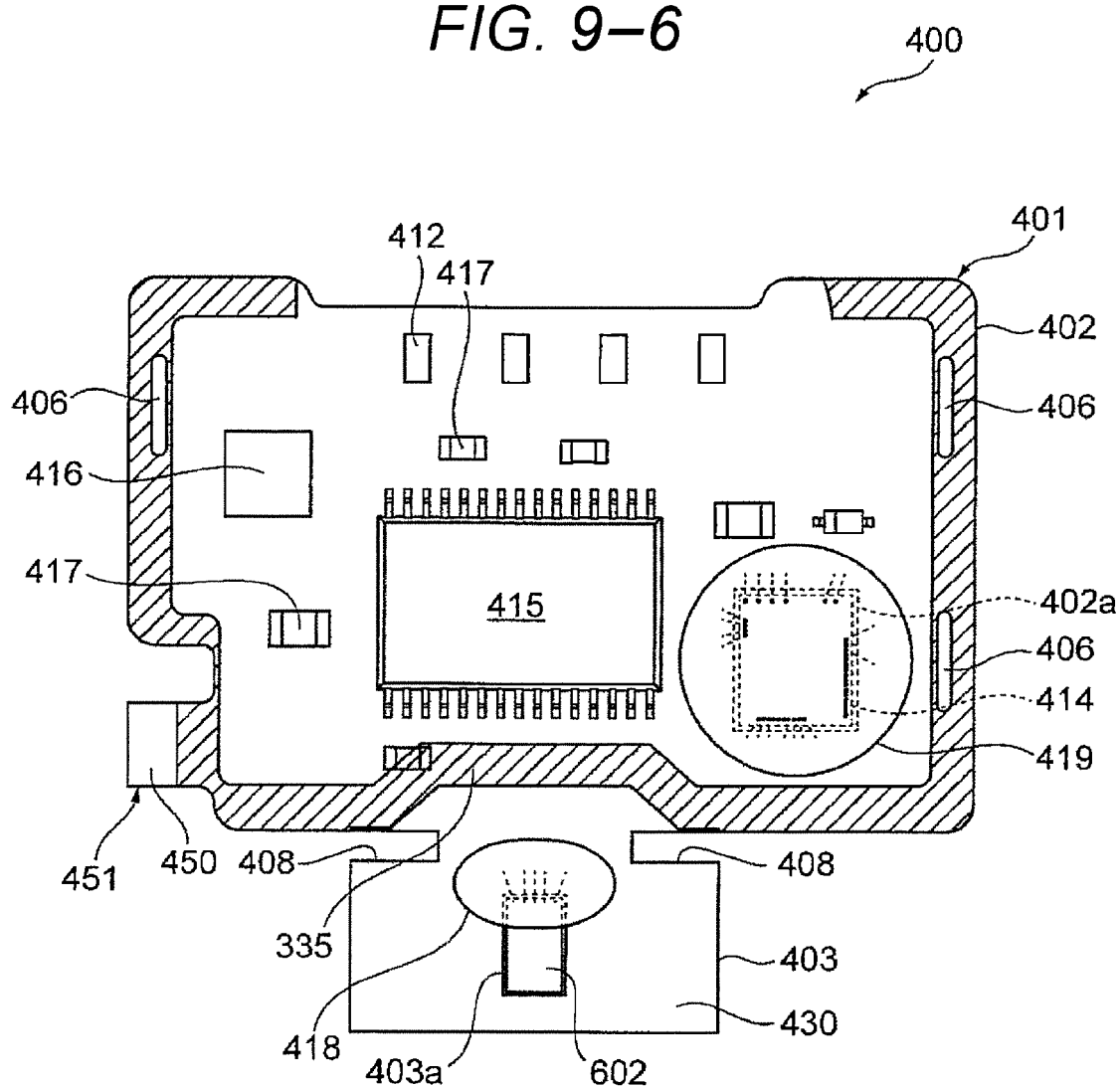
Figures 7, 9:
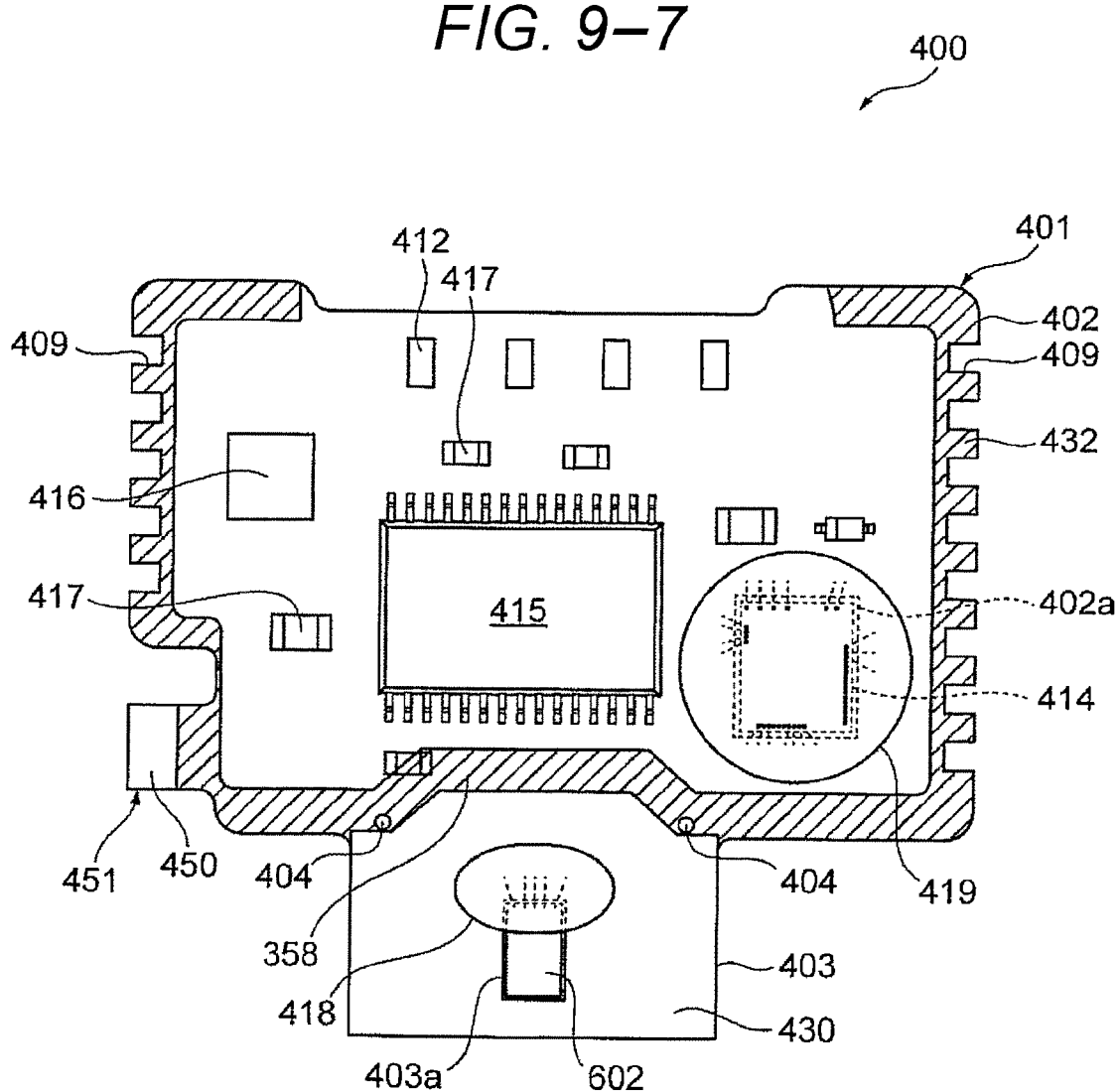
Figures 8, 9:
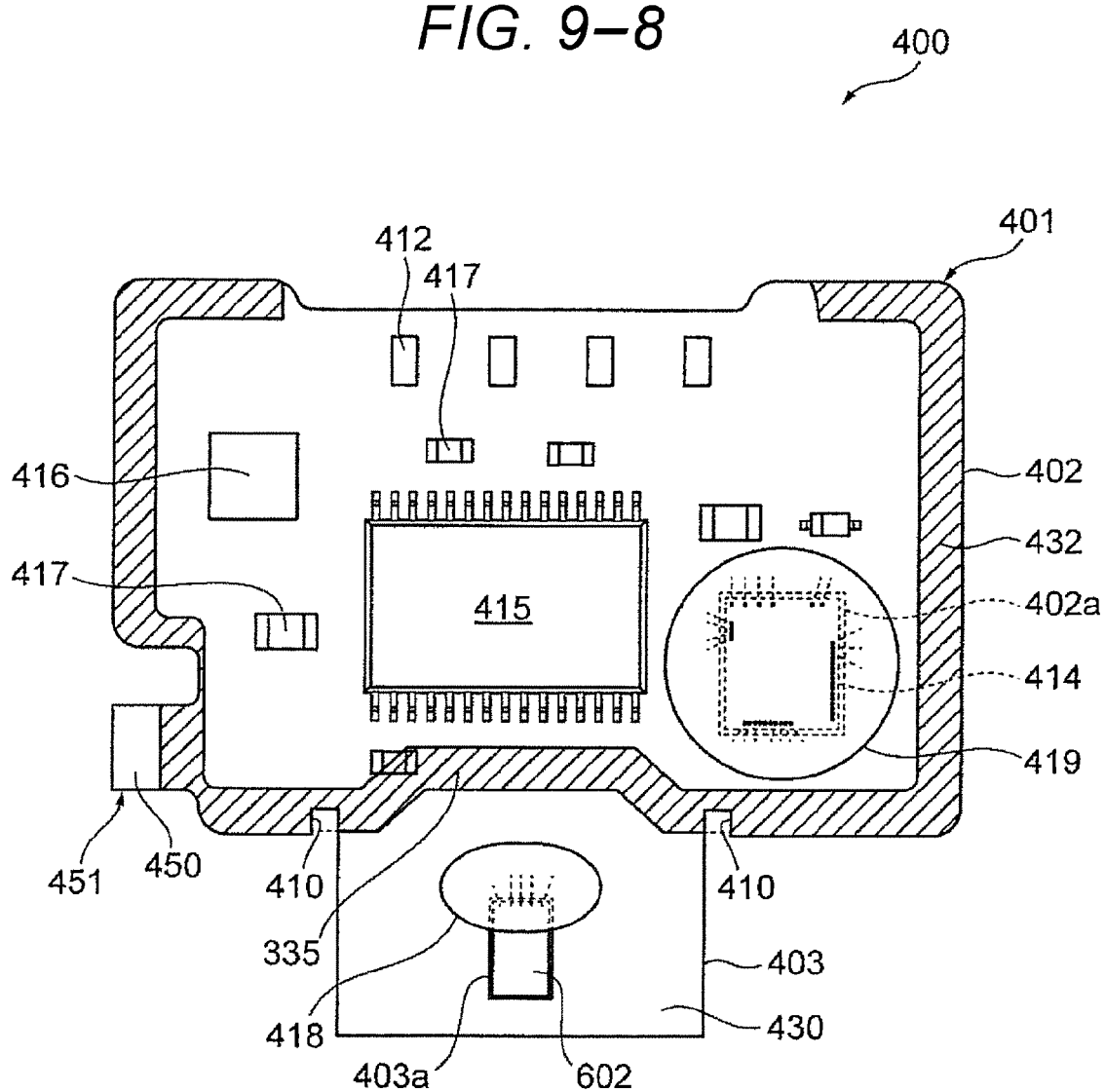

A hatched portion in FIG. 9-1 indicates the fixing surface 432 for covering the circuit board 400 by a thermoplastic resin to be used in resin molding processing to fix the circuit board 400 to the housing 302 in the resin molding processing. A relationship of shapes of the front surface of main air flow 430, the detection unit of air flow 602 disposed on the front surface of main air flow 430, and a bypass passage is highly accurately maintained so as to coincide with a prescribed relationship.

In resin molding processing, a bypass passage is formed, and the circuit board 400 is fixed to the housing 302 forming the bypass passage at the same time. Therefore, a relationship among the bypass passage, the front surface of main air flow 430, and the detection unit of air flow 602 can be extremely highly accurately maintained. Specifically, in the resin molding processing, the circuit board 400 is fixed to the housing 302, and therefore the circuit board 400 can be highly accurately positioned and fixed in a molding tool for forming the housing 302 including the bypass passage. By injecting high-temperature thermoplastic resin in the molding tool, a bypass passage is highly accurately formed, and the circuit board 400 is highly accurately fixed. Therefore, an error and variability by each circuit board 400 can be significantly reduced. As a result, measuring accuracy of the circuit board 400 can be significantly improved.

In the embodiment, an outer periphery of the base portion 402 of the board body 401 becomes the fixing surface 432 and 434 by covering the fixed portion 372 and 373 formed of a molded resin for forming the housing 302. In the embodiments illustrated in FIG. 9-1, as a fixing means for further firmly fixing, a fixing force of the board body 401 can be increased by burying a through hole 404 by a molded resin by providing the through hole 404 to the board body 401 of the circuit board 400. The through hole 404 is provided at the position fixed by the dividing wall 335, and on the dividing wall 335, a front side and a back side of the board body 401 are connected via the through hole 404.

The through hole 404 is preferably disposed at a position corresponding to the dividing wall 335. The molded resin is a thermoplastic resin, and the board body 401 is made of glass epoxy resin. Therefore, the molding resin has a chemical bonding action and not easily adhered. Then, the dividing wall 335 has a longer length than a wide and easily fills out in a direction separating from the board body 401. Therefore, by disposing the through hole 404 at a position corresponding to the dividing wall 335, the dividing walls 335 sandwiching the board body 401 therebetween can be physically bonded each other via the through hole 404. Therefore, the circuit board 400 can be further firmly fixed to the housing 302 and prevent from forming a space between the exposed portion 403 and the housing 302. Therefore, it is prevented that the gas being measured 30 enters in the circuit room Rc by passing through a space between the dividing wall 335 and the exposed portion 403 so that the circuit room Rc can be sealed completely.

In the embodiment illustrated in FIG. 9-2, in addition to the through hole 404, the through hole 405 having a round hole shape is disposed on each of an end of the upstream side and an end of the downstream side of the base portion 402, and a fixing force of the board body 401 is further increased by burying the through hole 405 by a molded resin. The end of the upstream side and the end of the downstream side of the base portion 402 are sandwiched from both sides on a thickness direction by the fixing portions 372 and 373 (refer to FIGS. 3-1 and 3-2) of the measuring unit 331, and a front side and a backside of the base portion 402 is connected via the through hole 405. Therefore, the circuit board 400 can be firmly fixed with respect to the housing 302.

The through hole 404 is preferably disposed on the dividing wall 335. However, in the case where the dividing wall 335 is fixed to the board body 401 with a predetermined fixing force, the through hole 404 can be omitted. In the embodiment illustrate in FIG. 9-3, the through hole 404 is omitted, and a through hole 405 is disposed on an end of the upstream side and an end of the downstream side of the base portion 402. In such the configuration, the board body 401 of the circuit board 400 can be firmly fixed to the housing 302.

A shape of a through hole is not limited to a round hole shape. The through hole may be the through hole 406 having a long hole shape, for example, as illustrated in FIG. 9-4. In the embodiment, the long hole-shaped through hole 406 is provided so as to extend along the end of the upstream side and the end of the downstream side of the base portion 402. In comparison with a round hole-shaped through hole, an amount of a resin for connecting a front side and a back side of the measuring unit 331 is increased in the through hole 406, and further high fixing force can be obtained.

In addition, the case of the through holes 404, 405, and 406 have been described as an example of a fixing means in each of the above-described embodiments. However, a through hole is not limited to the through holes 404, 405, and 406. For example, in the embodiments illustrated in FIG. 9-5, a large notch 407 extending over a longitudinal direction of the base portion 402 is provided on an end of the upstream side and an end of the downstream side of the base portion 402. Further, in the embodiments illustrated in FIG. 9-6, a notch 408 is provided along between the base portion 402 and the exposed portion 403. In addition, in the embodiment illustrated in FIG. 9-7, a plurality of the notches 409 is provided in line with predetermined intervals on the end of the upstream side and the end of the downstream side of the base portion 402. Furthermore, in the embodiment illustrate in FIG. 9-8, a pair of the notches 410 is provided which is cut toward the base portion 402 from both sides of the exposed portion 403. In such the configuration, the board body 401 of the circuit board 400 can be firmly fixed to the housing 302.

5. Circuit Configuration of Physical-Quantity Detection Device 300

Figures 1, 11:
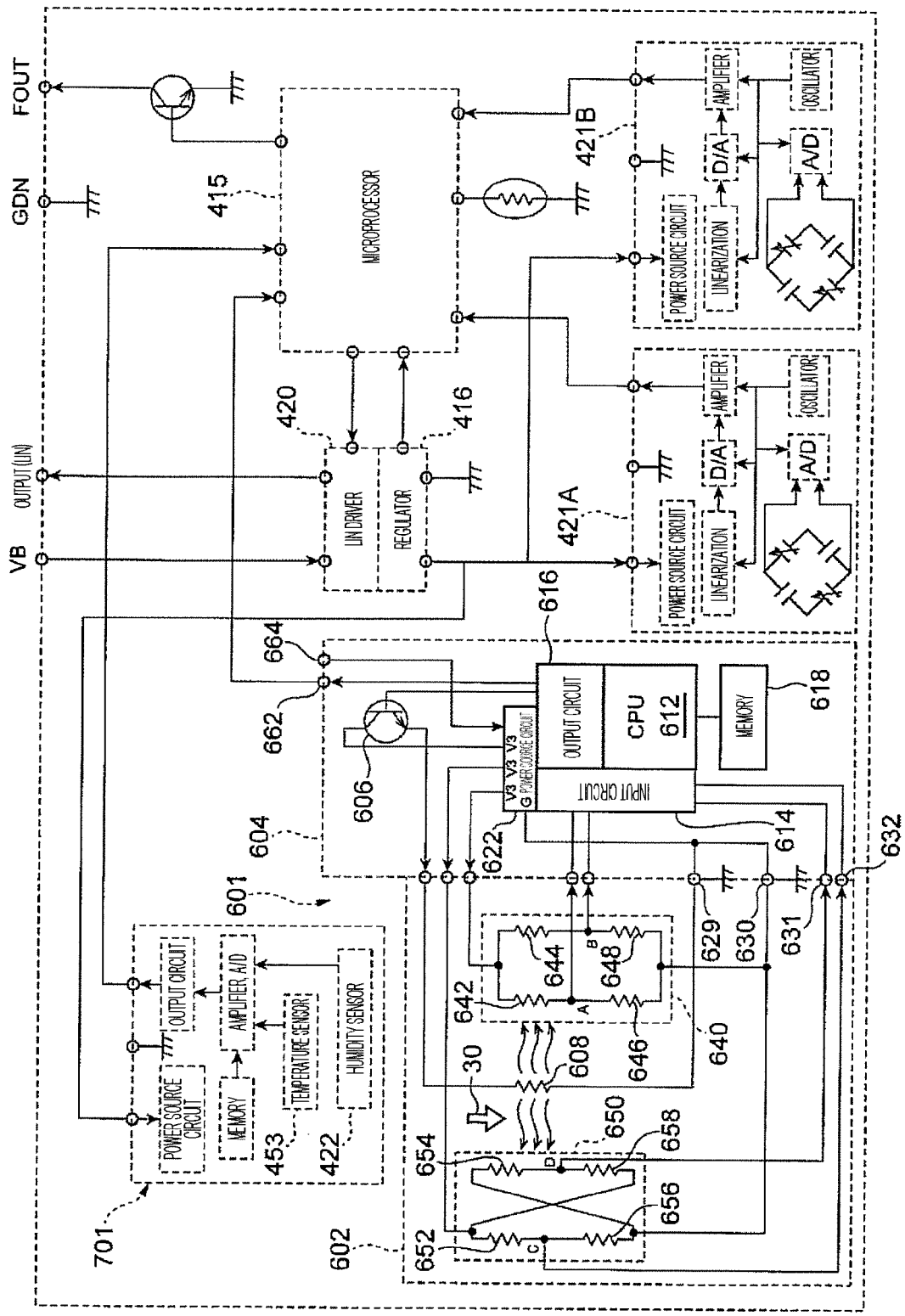
Figures 2, 11:
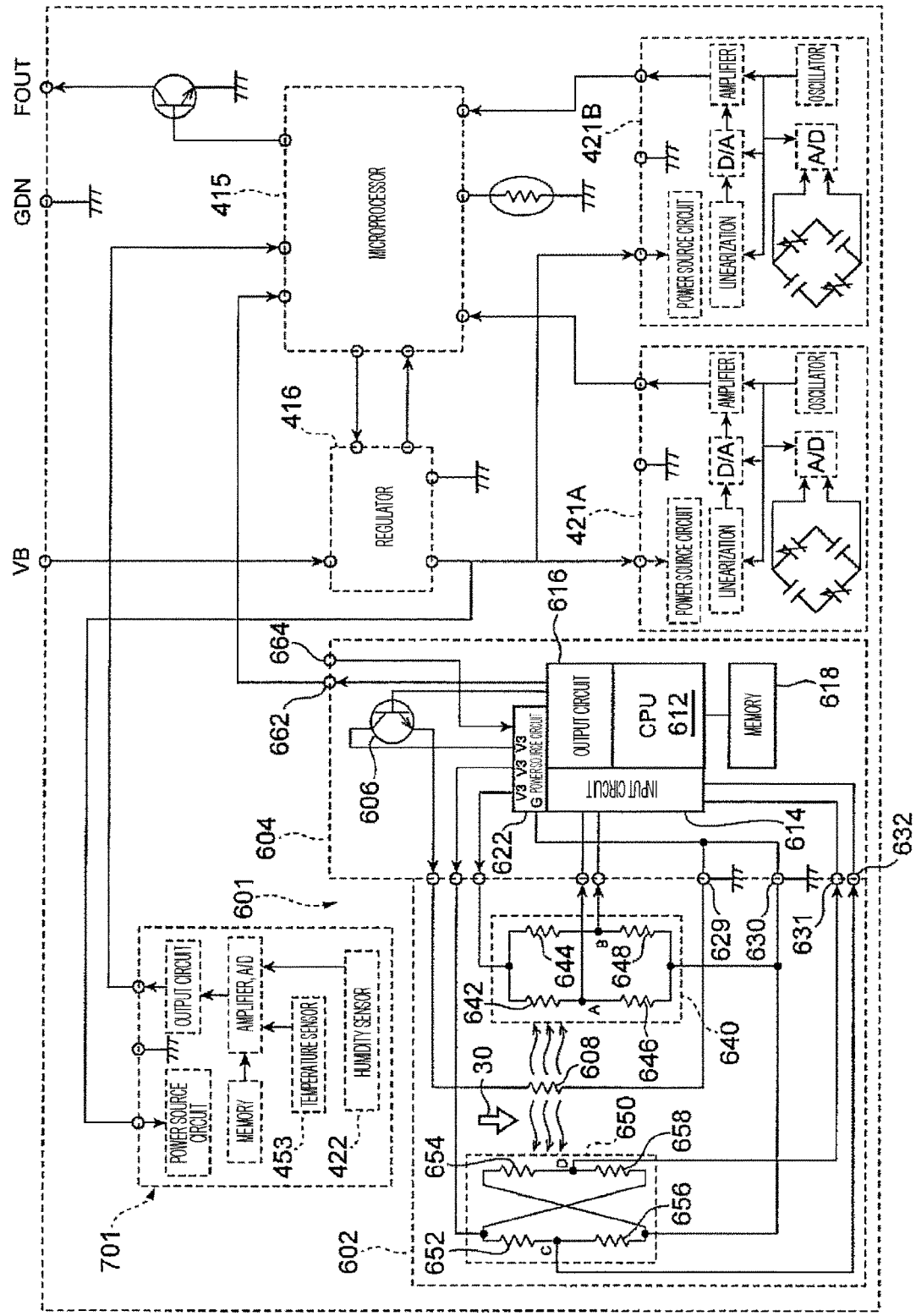

FIG. 11-1 is a circuit view of the physical-quantity detection device 300. The physical-quantity detection device 300 includes an air-flow detecting circuit 601 and a temperature/humidity detecting circuit 701.

The air-flow detecting circuit 601 includes the detection unit of air flow 602 including a heating element 608 and a processing unit 604. The processing unit 604 controls a heat generation amount of the heating element 608 of the detection unit of air flow 602 and outputs a signal indicating a flow rate on a basis of an output of the detection unit of air flow 602 to the microprocessor 415 via a terminal 662. To perform the processing, the processing unit 604 includes a central processing unit (hereinafter called a CPU) 612, an input circuit 614, an output circuit 616, a memory 618 including data indicating a relationship between a correction value, a measurement value, and a flow rate, and a power source circuit 622 supplying a constant voltage to each circuit as required. DC power is supplied from an external power source such as an on-vehicle battery to the power source circuit 622 via a terminal 664 and a ground terminal (not illustrated).

The heating element 608 to heat the gas being measured 30 is provided in the detection unit of air flow 602. From the power source circuit 622, a voltage V1 is supplied to a collector of a transistor 606 included in a current supply circuit of the heating element 608. A control signal is added to a base of the transistor 606 via the output circuit 616 from the CPU 612. Based on the control signal, a current is supplied from the transistor 606 to the heating element 608 via a terminal 624. An amount of current supplied to the heating element 608 is controlled by a control signal added to the transistor 606 included in the current supply circuit of the heating element 608 via the output circuit 616 from the CPU 612. The processing unit 604 controls a heating amount of the heating element 608 so as to increase a temperature of the gas being measured 30 by a predetermined temperature, for example, 100° C., by heating by the heating element 608.

The detection unit of air flow 602 includes a heat generation control bridge 640 for controlling a heating amount of the heating element 608 and a flow rate detection bridge 650 for measuring a flow rate. A constant voltage V3 is supplied from the power source circuit 622 to one end of the heat generation control bridge 640 via the terminal 626, and another end of the heat generation control bridge 640 is connected to a ground terminal 630. A constant voltage V2 is supplied from the power source circuit 622 to one end of the flow rate detection bridge 650 via a terminal 625, and another end of the flow rate detection bridge 650 is connected to the ground terminal 630.

The heat generation control bridge 640 includes a resistance 642 which is a temperature measuring resistor in which a resistance is changed based on a temperature of the heated gas being measured 30, and resistances 642, 644, 646, and 648 are included in a bridge circuit. A potential difference between an intersection point A of the resistances 642 and 646 and an intersection point B of the resistances 644 and 648 are input to the input circuit 614. In the CPU 612, a heat generation amount of the heating element 608 is controlled by controlling a current to be supplied from the transistor 606 such that a potential difference between the intersection points A and B becomes a predetermined value, which is zero volt in the embodiment. The air-flow detecting circuit 601 described in FIG. 11-1 heats the gas being measured 30 by the heating element 608. In this case, a temperature of the gas being measured 30 is heated to a temperature higher than an original temperature of the gas being measured 30 by a constant temperature, for example, to a temperature which is continuously 100° C. higher than the original temperature. A resistance value of each resistance included in the heat generation control bridge 640 is set such that a potential difference between the intersection points A and B becomes zero volt when a temperature of the gas being measured 30 heated by the heating element 608 becomes a temperature which is higher than an initial temperature by a constant temperature, for example, continuously 100° C., such that the heating control is highly accurately performed. Therefore, the air-flow detecting circuit 601 controls a current supplied to the heating element 608 such that a potential difference between the intersection points A and B becomes zero volt in the CPU 612.

The flow rate detection bridge 650 includes four temperature measuring resistors including resistors 652, 654, 656, and 658. These four temperature measuring resistors are disposed along a flow of the gas being measured 30. The resistances 652 and 654 are disposed on an upstream side on a flow passage of the gas being measured 30 with respect to the heating element 608. The resistances 656 and 658 are disposed on a downstream side on the flow passage of the gas being measured 30 with respect to the heating element 608. Further, to improve measuring accuracy, the resistances 652 and 654 are disposed such that distances to the heating element 608 become substantially equal to each other, and the resistances 656 and 658 are disposed such that distances to the heating element 608 become substantially equal to each other.

A potential difference between an intersection point C between the resistances 652 and 656 and an intersection point D between the resistances 654 and 658 are input to the input circuit 614 via terminals 632 and 631. To improve the measuring accuracy, for example, each resistance of the flow rate detection bridge 650 is set such that a potential difference between the intersection points C and D becomes zero in a state in which, for example, flow of the gas being measured 30 is zero. Therefore, in the case where the potential difference between the intersection points C and D is zero volt, based on a measurement result that a flow rate of the gas being measured 30 is zero, the CPU 612 outputs, from the terminal 662, an electric signal indicating that a flow rate of the main channel 124 is zero.

In the case where the gas being measured 30 flows in an arrow direction in FIG. 11-1, the resistances 652 and 654 disposed on an upstream side are cooled by the gas being measured 30, and the resistances 656 and 658 disposed on a downstream side of the gas being measured 30 is heated by the gas being measured 30 heated by the heating element 608. Consequently, temperatures of these resistance 656 and 658 are increased. Therefore, a potential difference between the intersection points C and D of the flow rate detection bridge 650 is generated, and the potential difference is input to the input circuit 614 via the terminals 631 and 632. The CPU 612 searches data indicating a relationship between the potential difference recorded in the memory 618 and a flow rate of the main channel 124 based on a potential difference between the intersection points C and D of the flow rate detection bridge 650 and measures a flow rate of the main channel 124. An electric signal indicating the flow rate of the main channel 124 measured in this manner is output via the terminal 662. The terminals 664 and 662 illustrated in FIG. 11-1 newly have reference numbers, and the terminals 664 and 662 are included in the connecting terminal 412 illustrated in FIG. 9-1 which has been described above.

The above-described memory 618 includes data indicating a relationship between the potential difference between the intersection points C and D and a flow rate of the main channel 124. Further, correction data to reduce a measuring error such as a variability measured based on a measured value of a gas is recorded after the circuit board 400 is manufactured.

The temperature/humidity detecting circuit 701 includes an input circuit and an output circuit of such as an amplifier and an A/D, a memory, and a power source circuit. The input circuit inputs a detection signal from the temperature sensor 453 and the humidity sensor 422. The memory holds data indicating a relationship among a correction value, a temperature, and an absolute humidity. The power source circuit supplies a constant voltage to each necessary circuit. Signal output from the air-flow detecting circuit 601 and the temperature/humidity detecting circuit 701 are input to the microprocessor 415. The microprocessor 415 includes a flow rate calculator, a temperature calculator, and an absolute humidity calculator. Based on a signal, the microprocessor 415 calculates a flow rate, a temperature, an absolute humidity which are a physical quantity of the gas being measured 30 and outputs them to the control device 200.

A communication cable connects between the physical-quantity detection device 300 and the control device 200, and communication is performed by using a digital signal in accordance with a communication standard such as SENT, LIN, and CAN. In the embodiment, a signal is input from the microprocessor 415 to a LIN driver 420, and the LIN driver 420 performs LIN communication. Information output from the LIN driver of the physical-quantity detection device 300 to the control device 200 is superimposed and output by digital communication using one or two communication cables.

An absolute humidity calculator of the microprocessor 415 calculates an absolute humidity based on relative humidity information and temperature information output from the humidity sensor 422 and correct the absolute humidity based on an error. An absolute humidity after correction calculated by the absolute humidity calculator is used in various engine operation controls in the control device 200. Further, the control device 200 can directly use information on a total error in various engine operation control.

In the above-described embodiment in FIG. 11, the case where the physical-quantity detection device 300 includes the LIN driver 420 and performs a LIN communication has been described. However, the LIN communication is not necessarily performed. As illustrated in FIG. 11-2, the physical-quantity detection device 300 may perform a direct communication with the microprocessor 415 without using the LIN communication.

The embodiments of the present invention has been described above in detail. However, the present invention is not limited to the embodiments, and a design can be variously changed within a spirit of the present invention described in CLAIMS. For example, the above-described embodiments describe the present invention in detail for clarification, and every configurations described above may not be necessarily included. Further, a configuration of each embodiment can be partially replaced to configurations of the other embodiments. Furthermore, a configuration of each embodiment can be added to configurations of the other embodiments. Furthermore, a part of a configuration of each embodiment can be added to, deleted from, and replaced from other configurations.

REFERENCE SIGNS LIST 30 gas being measured
124 main channel
300 physical-quantity detection device
302 housing
400 circuit board
404, 405, 406 through hole
407, 408 notch
421A, 421B pressure sensor (third detection unit)
422 humidity sensor (second detection unit)
602 detection unit of air flow (first detection unit)

The invention claimed is:

1. A physical-quantity detection device, comprising:
a circuit board including at least one detection unit configured to detect a physical quantity of intake air which is a gas being measured that passes through a main channel that is coupled to a combustion chamber of an internal combustion engine, and a circuit unit configured to perform a computation on the physical quantity detected by the detection unit; and
a housing configured to accommodate the circuit board, at least a portion of the housing being fixed to a wall of the main channel coupled to the combustion chamber of the internal combustion engine,
wherein the housing is formed of a molded resin, and the circuit board is integrally formed together with the housing,
wherein at least either of a through hole or a notch is disposed at a portion of the circuit board to be inserted into the housing, a molded resin is bonded on a front side and a back side of the circuit board, and the front side and the back side of the circuit board are connected via the through hole or the notch, wherein the housing includes: a circuit room in which the circuit unit is disposed; a first bypass passage in which a first detection unit is disposed, and the gas being measured flows; and a dividing wall configured to divide the circuit room and the first bypass passage, wherein the through hole or the notch is disposed at a position covered by the dividing wall, and wherein the housing is divided into a front surface side and a back surface side by the circuit board, the circuit room is formed on a front surface side of the housing, a sensor room accommodating a second detection unit is formed on a back surface side of the housing, and a second bypass passage in which the gas being measured flows is disposed to communicate with the sensor room.

2. The physical-quantity detection device according to claim 1, wherein the circuit board has a connecting terminal connected to an external terminal, and wherein the connecting terminal is arranged on one side of the circuit board, and a surface of the circuit board where the connecting terminal is arranged is not covered with the molded resin, and a back surface of the surface where the connecting terminal is arranged is covered with the molded resin.

3. The physical-quantity detection device according to claim 1, wherein the second bypass passage extends along a flow direction of the gas being measured flowing in the main channel, the sensor room communicates with an upper portion of the second bypass passage, and a humidity sensor is accommodated as the second detection unit.

4. The physical-quantity detection device according to claim 3, wherein, in the sensor room, a pressure sensor is disposed at an upper position of the humidity sensor as a third detection unit.

5. A physical-quantity detection device, comprising:

a circuit board including at least one detection unit configured to detect a physical quantity of intake air which is a gas being measured that passes through a main channel that is coupled to a combustion chamber of an internal combustion engine, and a circuit unit configured to perform a computation on the physical quantity detected by the at least one detection unit; and a housing configured to accommodate the circuit board, at least a portion of the housing being fixed to a wall of the main channel coupled to the combustion chamber of the internal combustion engine, wherein the housing is formed of a thermoplastic resin, and the circuit board is molded in the thermoplastic resin of the housing and integrally fixed together with the housing, wherein at least either of a through hole or a notch is disposed at a portion of the circuit board to be inserted into the housing, a molded resin is bonded on a front side and a back side of the circuit board, and the front side and the back side of the circuit board are connected via the through hole or the notch, wherein the housing includes: a circuit room in which the circuit unit is disposed; a first bypass passage in which a first detection unit is disposed, and the gas being measured flows; and a dividing wall configured to divide the circuit room and the first bypass passage, wherein the through hole or the notch is disposed on a side of the circuit board, and wherein the housing is divided into a front surface side and a back surface side by the circuit board, the circuit room is formed on a front surface side of the housing, a sensor room accommodating a second detection unit is formed on a back surface side of the housing, and a second bypass passage in which the gas being measured flows is disposed to communicate with the sensor room.

6. The physical-quantity detection device according to claim 5, wherein a board body of the circuit board is formed by a material made of a glass epoxy resin.

7. The physical-quantity detection device according to claim 5, wherein the circuit board has a connecting terminal connected to an external terminal, and wherein the connecting terminal is arranged on one side of the circuit board, and a surface of the circuit board where the connecting terminal is arranged is not covered with the molded resin, and a back surface of the surface where the connecting terminal is arranged is covered with the molded resin.

8. The physical-quantity detection device according to claim 5, wherein the second bypass passage extends along a flow direction of the gas being measured flowing in the main channel, and the sensor room communicates with an upper portion of the second bypass passage, and a humidity sensor is accommodated as the second detection unit.

9. The physical-quantity detection device according to claim 8, wherein, in the sensor room, a pressure sensor is disposed at an upper position of the humidity sensor as a third detection unit.

* * * * *